US012663174B2

(12) United States Patent    (10) Patent No.:   US 12,663,174 B2

Nidaira et al.    (45) Date of Patent:   Jun. 23, 2026

(54) AIR CONDITIONER, AIR CONDITIONING CONTROL APPARATUS, AND AIR CONDITIONING SYSTEM

(71) Applicant: FUJITSU GENERAL LIMITED, Kanagawa (JP)

(72) Inventors: Takuro Nidaira, Kanagawa (JP); Kotaro Wada, Kanagawa (JP); Kento Kamitsuma, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 338 days.

(21) Appl. No.: 18/274,625

(22) PCT Filed: Feb. 10, 2022

(86) PCT No.: PCT/JP2022/005496

§ 371 (c)(1),
(2) Date: Jul. 27, 2023

(87) PCT Pub. No.: WO2022/173020

PCT Pub. Date: Aug. 18, 2022

(65) Prior Publication Data

US 2024/0102680 A1   Mar. 28, 2024

(30) Foreign Application Priority Data

Feb. 12, 2021   (JP) ................................. 2021-020984
Mar. 10, 2021   (JP) ................................. 2021-038589
(Continued)

(51) Int. Cl.
*F24F 11/56*    (2018.01)
*H04L 43/0829*    (2022.01)
*H04L 43/0882*    (2022.01)

(52) U.S. Cl.
CPC .......... *F24F 11/56* (2018.01); *H04L 43/0829* (2013.01); *H04L 43/0882* (2013.01)

(58) Field of Classification Search
CPC .. F24F 11/56; F24F 11/30; F24F 11/58; F24F 11/62; F24F 11/54; F24F 11/63;
(Continued)

(56) References Cited

U.S. PATENT DOCUMENTS

2006/0063527 A1   3/2006   Ito
2006/0277185 A1   12/2006   Sato et al.
(Continued)

FOREIGN PATENT DOCUMENTS

CN    110398027 A   11/2019
JP    2005-44369 A   2/2005
(Continued)

OTHER PUBLICATIONS

Notice of Reason for Refusal issued in Japanese Counterpart Patent Appl. No. 2021-020984, dated Apr. 26, 2022, along with an English translation thereof.
(Continued)

*Primary Examiner* — Charles R Kasenge

(74) *Attorney, Agent, or Firm* — Greenblum & Bernstein, P.L.C.

(57) ABSTRACT

A communication adapter connected to an indoor unit included in an air conditioner includes a communication unit, a determination unit, and a communication control unit. The communication unit communicates data to an air conditioning control apparatus that performs centralized control of a plurality of air conditioners. The determination unit determines whether or not transmission target data is communicated by using encryption communication. The communication control unit controls, when the transmission target data is communicated by using the encryption com- (Continued)

munication, the communication unit in order to communicate the transmission target data by using the encryption communication. Consequently, it is possible to decrease a laying cost of a dedicated communication cable and reduce a communication load needed for data communication related to the air conditioners in an existing communication network at the time of central control performed on the air conditioners.

23 Claims, 20 Drawing Sheets

(30)          Foreign Application Priority Data

Mar. 26, 2021    (JP) ................................. 2021-054227
Mar. 26, 2021    (JP) ................................. 2021-054228

(58) Field of Classification Search
    CPC . H04L 43/0829; H04L 43/0882; H04L 9/088;
            H04L 2209/42; H04L 63/0428; H04L
            9/14; H04L 63/20; G05B 2219/2614;
            G05B 15/02; H04Q 2209/823; H04Q
            9/00; G08C 17/02; H04W 12/033
    See application file for complete search history.

(56)                References Cited

U.S. PATENT DOCUMENTS

| | | | |
|---|---|---|---|
| 2007/0041323 A1 | 2/2007 | Kitahara et al. | |
| 2007/0294753 A1 | 12/2007 | Tanaka et al. | |
| 2010/0257355 A1* | 10/2010 | Shinozaki ................. | H04L 9/00 |
| | | | 713/153 |
| 2017/0017247 A1* | 1/2017 | Fassier ............... | G05D 23/1905 |
| 2017/0163437 A1 | 6/2017 | Yang et al. | |
| 2021/0258151 A1 | 8/2021 | Cristina et al. | |
| 2021/0392535 A1 | 12/2021 | Nabeshima et al. | |
| 2022/0239642 A1 | 7/2022 | Kataoka | |

FOREIGN PATENT DOCUMENTS

| | | | |
|---|---|---|---|
| JP | 2006-50524 | A | 2/2006 |
| JP | 2006-87032 | A | 3/2006 |
| JP | 2006-323598 | A | 11/2006 |
| JP | 2006-338587 | A | 12/2006 |
| JP | 2007-53465 | A | 3/2007 |
| JP | 2007-323553 | A | 12/2007 |
| JP | 2009-003896 | A | 1/2009 |
| JP | 2011-151490 | A | 8/2011 |
| JP | 2011-176438 | A | 9/2011 |
| JP | 2013-102529 | A | 5/2013 |
| JP | 2015-17768 | A | 1/2015 |
| JP | 2020-68469 | A | 4/2020 |
| JP | 2020-205474 | A | 12/2020 |
| JP | 2022-123585 | A | 8/2022 |
| JP | 2022-138616 | A | 9/2022 |
| JP | 2022-151244 | A | 10/2022 |
| JP | 2022-151245 | A | 10/2022 |
| WO | 2009/078103 | A1 | 6/2009 |
| WO | 2012/114371 | A1 | 8/2012 |
| WO | 2020/015877 | | 1/2020 |

OTHER PUBLICATIONS

Notice of Reason for Refusal issued in Japanese Counterpart Patent Appl. No. 2021-038589, dated Apr. 26, 2022, along with an English translation thereof.
Notice of Reason for Refusal issued in Japanese Counterpart Patent Appl. No. 2021-054228, dated Apr. 26, 2022, along with an English translation thereof.
Notice of Reason for Refusal issued in Japanese Counterpart Patent Appl. No. 2021-054227, dated Apr. 26, 2022, along with an English translation thereof.
International Search Report Issued in International Patent Application No. PCT/JP2022/005496, dated May 10, 2022, along with an English translation thereof.
The extended European search report dated Nov. 21, 2024 issued in European Patent Application No. 22752842.
Chinese Office Action dated Jul. 31, 2025 issued in Chinese patent application No. 202280012191.6 along with an English translation.

* cited by examiner

| DATA TYPE | DATA CONTENT |
|---|---|
| ENCRYPTION TARGET | AIR CONDITIONING ON/OFF |
| | OPERATION MODE |
| | SET TEMPERATURE |
| | WIND DIRECTION & AIR VOLUME |
| UN-ENCRYPTION TARGET | DEVICE MODEL NAME OF AIR CONDITIONER |
| | IP ADDRESS OF AIR CONDITIONER |
| | FAILURE DETECTION INFORMATION |
| | CONTROL INFORMATION FROM AIR CONDITIONING CONTROL APPARATUS |
| | CONTROL INFORMATION TO AIR CONDITIONING CONTROL APPARATUS |

| CONGESTION INDEX C | DATA TYPE | CONFIDENTIALITY |
|---|---|---|
| $3 \le C \le 4$ | AIR CONDITIONING ON/OFF | HIGH |
| | WIND DIRECTION & AIR VOLUME | |
| $2 \le C \le 4$ | OPERATION MODE | MEDIUM |
| | SET TEMPERATURE | |
| $1 \le C \le 4$ | DEVICE MODEL NAME | LOW |
| | DEVICE MODEL TYPE | |
| | FAILURE DETECTION INFORMATION | |

38(68)

| CONNECTION COUNT n | DATA TYPE | CONFIDENTIALITY |
|---|---|---|
| 110<n≤128 | AIR CONDITIONING ON/OFF | HIGH |
| | WIND DIRECTION & AIR VOLUME | |
| 100≤n≤128 | OPERATION MODE | MEDIUM |
| | SET TEMPERATURE | |
| 80<n≤128 | DEVICE MODEL NAME | LOW |
| | DEVICE MODEL TYPE | |
| | FAILURE DETECTION INFORMATION | |

68A(38A)

68A1(38A1)

| AMOUNT OF PROCESSING LOAD I | DATA TYPE | CONFIDENTIALITY |
|---|---|---|
| $3 \le I \le 4$ | AIR CONDITIONING ON/OFF | HIGH |
| | WIND DIRECTION & AIR VOLUME | |
| $2 \le I \le 4$ | OPERATION MODE | MEDIUM |
| | SET TEMPERATURE | |
| $1 \le I \le 4$ | DEVICE MODEL NAME | LOW |
| | DEVICE MODEL TYPE | |
| | FAILURE DETECTION INFORMATION | |

FIG.20

$\zeta$37

| DEVICE TYPE | INDOOR UNIT TYPE |
|---|---|
| ENCRYPTION TARGET DEVICE | WALL MOUNTED TYPE |
| UN-ENCRYPTION TARGET DEVICE | CEILING TYPE |
| | DUCT TYPE |

AIR CONDITIONER, AIR CONDITIONING CONTROL APPARATUS, AND AIR CONDITIONING SYSTEM

FIELD

The present invention relates to an air conditioner, an air conditioning control apparatus, and an air conditioning system.

BACKGROUND

In recent years, Internet connection services provided using wired local area networks (LANs) or wireless LANs become popular, and, in some cases, a communication network for providing the Internet connection service (for example, free Wi-Fi (registered trademark)) using a wireless LAN is equipped and laid in an architectural structure (hereinafter, sometimes referred to as a building) that contains therein, for example, an accommodation facility, a public facility, or the like. In contrast, in general, a dedicated communication cable is laid in order to perform central control on air conditioners that are arranged in many different locations in this kind of building.

CITATION LIST

Patent Literature

Patent Literature 1: Japanese Laid-open Patent Publication No. 2020-68469
Patent Literature 2: Japanese Laid-open Patent Publication No. 2015-017768

SUMMARY

Technical Problem

Accordingly, for example, it is conceivable to decrease a wiring cost by eliminating laying of the dedicated communication cable by diverting this kind of existing communication network to central control of the air conditioners that are arranged in many different locations in this kind of building. However, the communication network provided in the building is a communication network to which a large number of unspecified users who are present in the building connects, so that confidentiality is sometimes maintained for the content of communication data related to the air conditioning. However, if the communication data is encrypted in order to guarantee the confidentiality, a communication procedure for encryption of, for example, a handshake, a key exchange, or the like become complicated. For this reason, in the air conditioners, the load placed on encryption/decoding processes performed by a communication unit may possibly become large. In addition, the communication network provided in the building is used when the Internet is used, so that, in the case where the communication network provided in the building is used for data communication related to the air conditioners, it is demanded that the data communication related to the air conditioners have little influence on the communication that is performed on the Internet connection service side.

Accordingly, the present invention has been conceived in light of the circumstances described above and an object thereof is to provide an air conditioner, an air conditioning control apparatus, and an air conditioning system capable of decreasing a laying cost of a dedicated communication cable that is used at the time of central control performed on the air conditioner and capable of reducing communication load needed for data communication related to the air conditioner performed in an existing communication network.

Solution to Problem

According to an aspect of an embodiment, an air conditioner includes a communication unit, a determination unit and a communication control unit. The communication unit communicates data to an air conditioning control apparatus that performs centralized control of a plurality of air conditioners. The determination unit determines whether or not transmission target data is communicated by using encryption communication. The communication control unit controls, when the transmission target data is communicated by using the encryption communication, the communication unit in order to communicate the transmission target data by using the encryption communication.

Advantageous Effects of Invention

As an aspect of an embodiment, it is possible to reduce a cost of an air conditioning system constituted of an air conditioning control apparatus and an air conditioner and communication load that is needed for data communication performed between configuration devices.

BRIEF DESCRIPTION OF DRAWINGS

FIG. 4 is a diagram illustrating one example of a data type table.

FIG. 20 is a diagram of a data column illustrating one example of data stored in a device type table.

DESCRIPTION OF EMBODIMENTS

Preferred embodiments of an air conditioner, an air conditioning control apparatus, and an air conditioning system disclosed in the present invention will be explained in detail with reference to accompanying drawings. Furthermore, the disclosed technology is not limited to the present embodiments. Furthermore, the embodiments described below may also be appropriately modified as long as the embodiments do not conflict with each other.

First Embodiment

<Configuration of Air Conditioning System>

Figure 1:
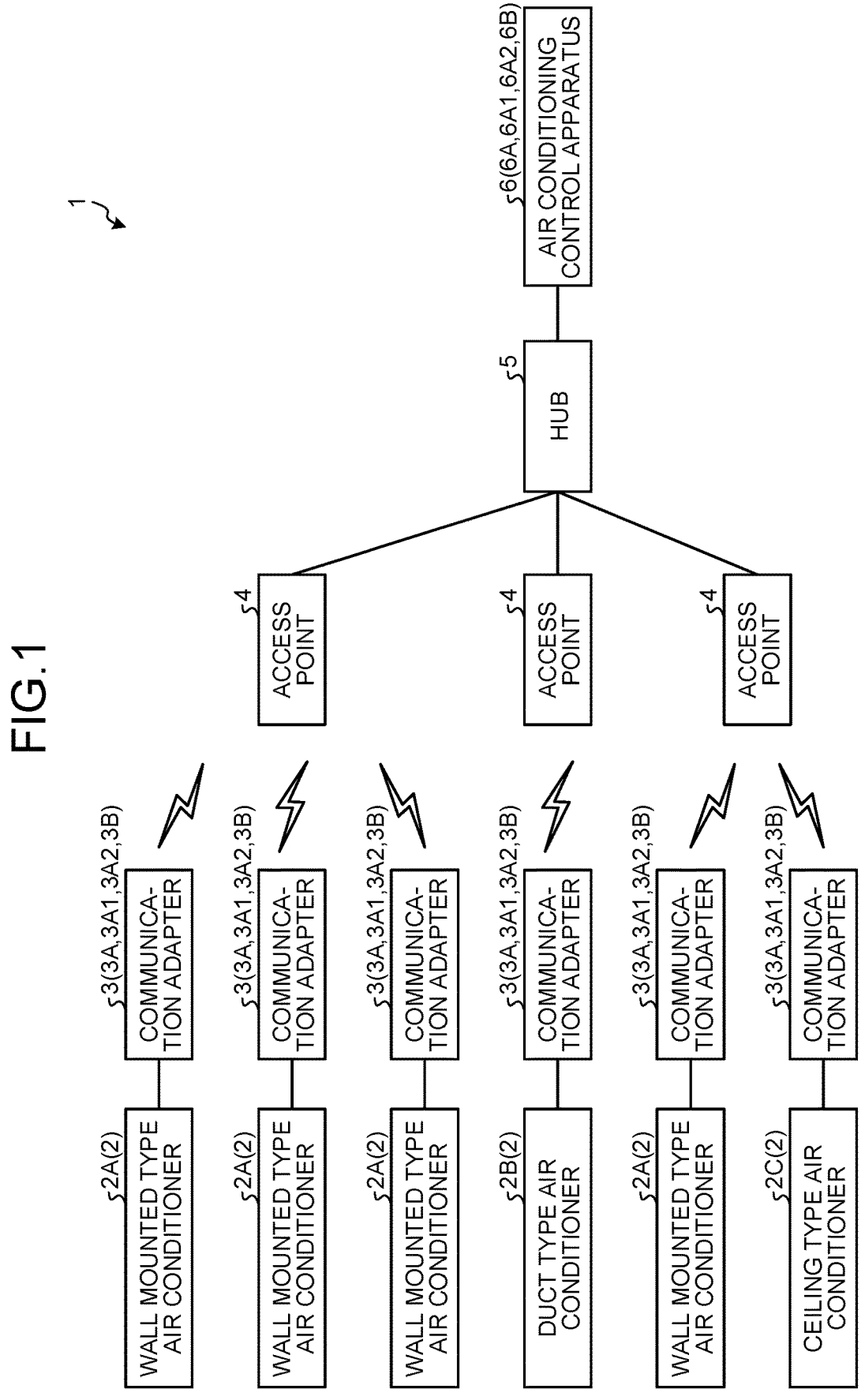
FIG. 1 is a diagram illustrating one example of an air conditioning system according to the present embodiment.

FIG. 1 is a diagram illustrating one example of an air conditioning system 1 according to a first embodiment. The air conditioning system 1 illustrated in FIG. 1 is a system constituted of air conditioners 2 disposed in, for example, a building, such as an accommodation facility or a public facility, an air conditioning control apparatus 6 that manages the air conditioners 2, and the like. The air conditioning system 1 includes the air conditioners 2, communication adapters 3, access points 4, a hub 5, and the air conditioning control apparatus 6. Each of the air conditioners 2 includes several different types of indoor units 21 that are, for example, a wall mounted type air conditioner 2A, a duct type air conditioner 2B, and a ceiling type air conditioner 2C. The wall mounted type air conditioner 2A is an air conditioner having a structure constituted such that the indoor unit 21 is hung on a wall of a room. The duct type air conditioner 2B is an air conditioner that supplies air flowing from the indoor unit 21 to each of rooms by way of a duct. The ceiling type air conditioner 2C is an air conditioner constituted such that the indoor unit 21 is installed on a ceiling of, for example, a large room. Furthermore, any number of the air conditioners 2 included in the air conditioning system 1 may be used, and the number of, for example, the wall mounted type air conditioners 2A, the duct type air conditioners 2B, and the ceiling type air conditioners 2C may be appropriately changed. In addition, the communication adapters 3 may be built into each of the wall mounted type air conditioner 2A, the duct type air conditioner 2B, and the ceiling type air conditioner 2C.

<Configuration of Air Conditioner>

Figure 2:
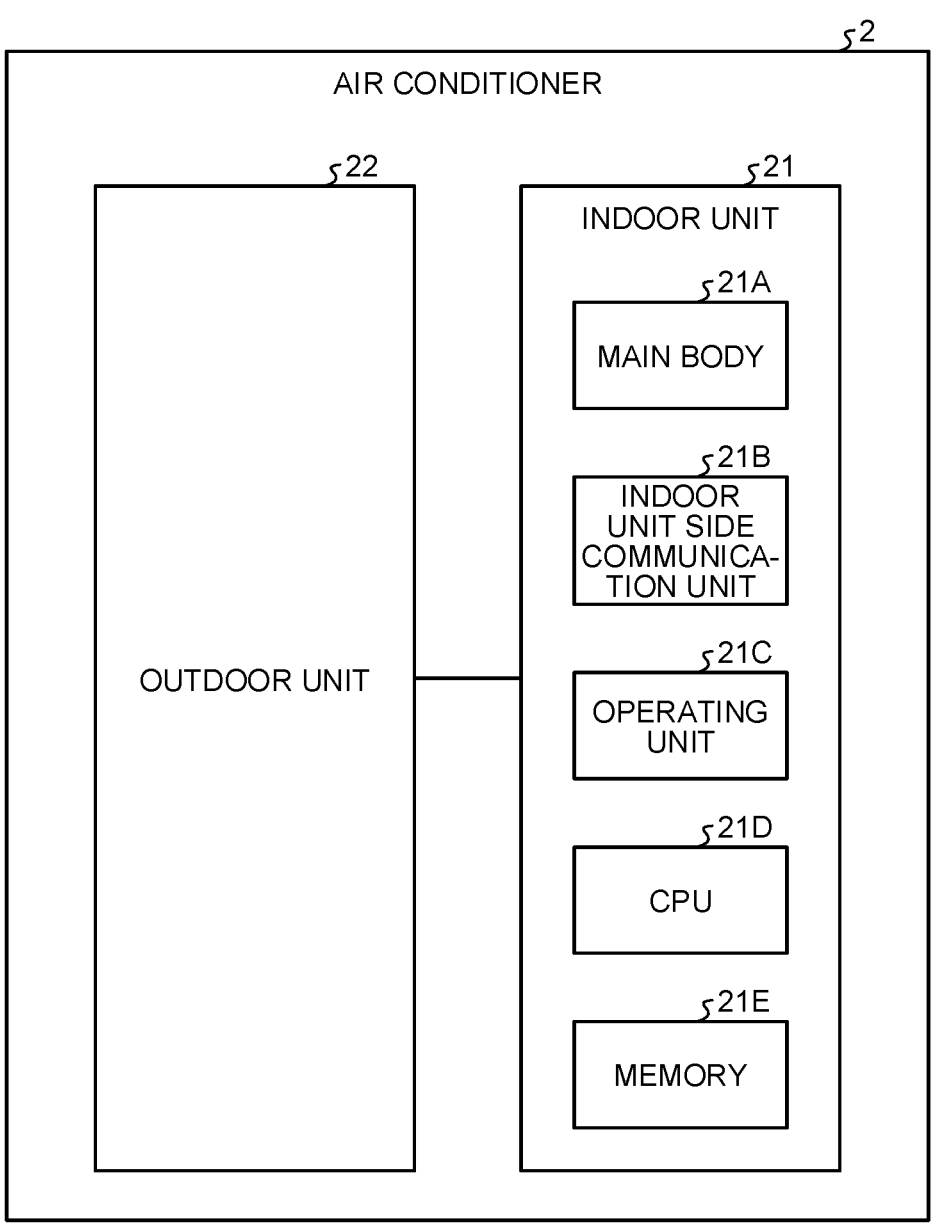
FIG. 2 is a block diagram illustrating one example of a configuration of an air conditioner.

FIG. 2 is a block diagram illustrating one example of a configuration of the air conditioner 2. The air conditioner 2 illustrated in FIG. 2 includes the indoor unit 21 and an outdoor unit 22. The indoor unit 21 is arranged in, for example, the interior of a room and is a part of the air conditioner 2 that heats or cools air in the interior of the room that is an air conditioned space. It is assumed that the indoor unit 21 is provided in, for example, an air conditioned space in a room or the like. The indoor unit 21 includes a main body 21A, an indoor unit side communication unit 21B, an operating unit 21C, a CPU 21D, and a memory 21E. The main body 21A is provided with an indoor fan, an indoor heat exchanger, and the like that are not illustrated, and indoor air that has been subjected to heat exchange, by an indoor heat exchanger, with a refrigerant that is supplied from the outdoor unit 22 is blown out by an indoor fan, whereby heating, cooling, dehumidification, or the like of the room is performed. The indoor unit side communication unit 21B is an interface that communicates with the communication adapter 3 by using, for example, a universal asynchronous receiver transmitter (UART) method. The operating unit 21C is an interface that inputs various commands to the indoor unit 21. The CPU 21D performs overall control of the indoor unit 21. The memory 21E stores therein various kinds of information. The CPU 21D executes various commands on the basis of a command signal. The outdoor unit 22 is provided with, for example, an outdoor fan, a compressor, and the like.

The communication adapter 3 has a communication function for communicating with the indoor unit 21 that is included in the air conditioner 2 by using the URAT method, and a communication function for communicating with the hub 5 by using a wireless local area network (LAN). Furthermore, the wireless LAN is a communication network including, for example, free Wi-Fi, or the like capable of being connected by a large number of unspecified user who are present inside the building. The communication adapter 3 is arranged for each of the indoor units 21. Furthermore, the communication adapter 3 relays communication between the indoor unit 21 and the wireless LAN, and is thus a part of the air conditioner 2. The access point 4 includes a communication function for connecting to the communication adapter 3 by using wireless communication using, for example, a wireless LAN, or the like, and a communication function for connecting to the hub 5 by using wire communication. The hub 5 has a communication function for connecting a plurality of access points 4 and the air conditioning control apparatus 6 by using wire communication. The air conditioning control apparatus 6 is a controller that monitors and controls each of the air conditioners 2 included in the air conditioning system 1.

<Configuration of Communication Adapter>

Figure 3:
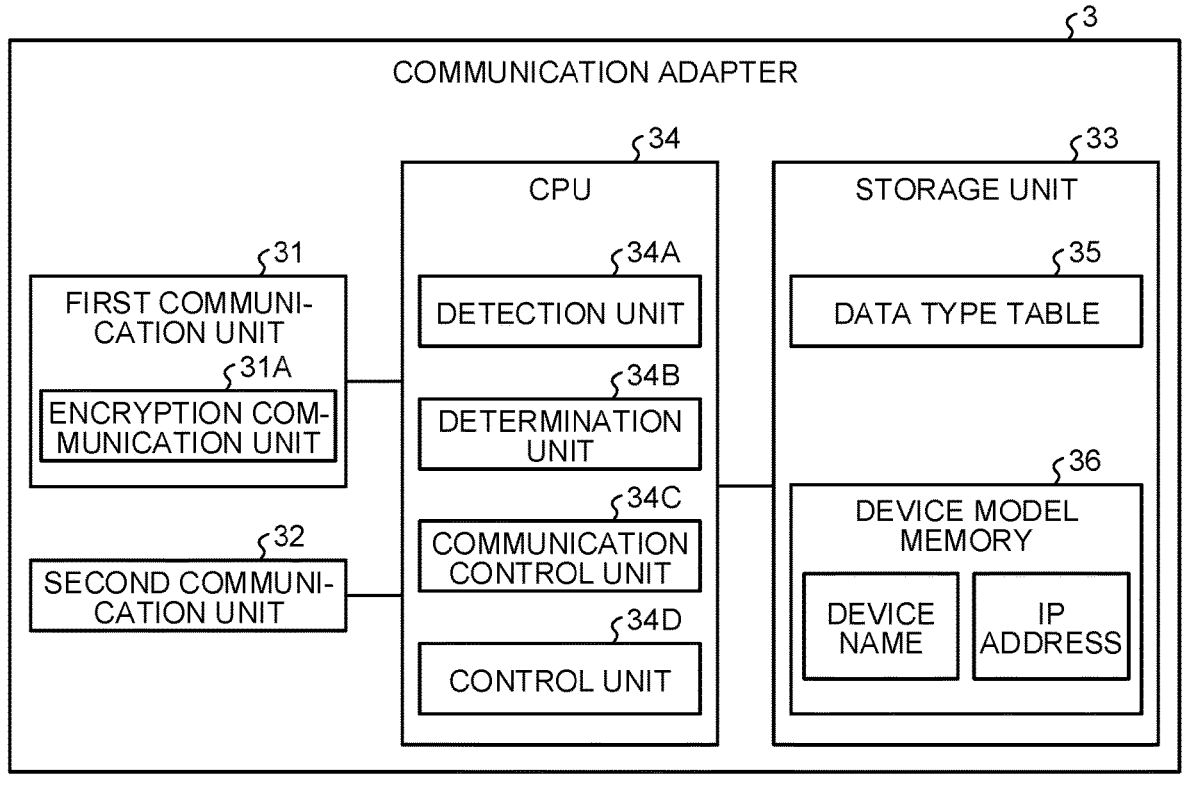
FIG. 3 is a block diagram illustrating one example of a configuration of a communication adapter according to a first embodiment.

FIG. 3 is a block diagram illustrating one example of a configuration of the communication adapter 3 according to the first embodiment. The communication adapter 3 illustrated in FIG. 3 includes a first communication unit 31, a second communication unit 32, a storage unit 33, and a central processing unit (CPU) 34. The first communication unit 31 is a communication unit that performs communication connection between the access point 4 and the CPU 34 and that is a communication interface (IF) or the like for, for example, a WLAN or the like. The second communication unit 32 is a unit that performs communication connection between the CPU 21D that is included in the indoor unit 21 and the CPU 34 and that is a communication interface for, for example, a UART or the like. The storage unit 33 includes, for example, a read only memory (ROM), a random access memory (RAM), and the like, and stores therein various kinds of information, such as data and programs. The CPU 34 performs overall control of the communication adapter 3.

The first communication unit 31 has a function for performing data communication with the air conditioning control apparatus 6 by way of the hub 5 by using encryption communication or un-encryption communication. The first communication unit 31 includes an encryption communication unit 31A that performs a function of the encryption communication. As the encryption communication, a function for encrypting data by using, for example, Transport Layer Security (TLS) for Hyper Text Transfer Protocol Secure (HTTPS) and transmitting the encrypted data, and a function for decoding the encrypted data by using TLS for HTTPS are included. Furthermore, the TLS for the HTTPS performs a plurality of handshakes between devices by using a public key and a common key. As the un-encryption communication, a function for transmitting data by using, for example, a user data protocol (UDP) without performing the encryption communication, and a function for receiving the data by using the UDP are included. Furthermore, the UDP is communication performed without using a handshaking process between the devices. The second communication unit 32 has a function for performing data communication with the indoor unit side communication unit 21B included in the indoor unit 21 by using the UART communication.

The storage unit 33 includes a data type table 35 and a device model memory 36. The data type table 35 is a table that is used to determine whether or not, when various kinds of data is communicated, the pieces of data are to be encrypted. FIG. 4 is a diagram illustrating one example of the data type table 35. The data type table 35 illustrated in FIG. 4 is a table that manages data content associated with each of the data types. The data type table 35 manages the data related to a user who uses the air conditioner 2 as a data type that is associated with an encryption target, and also manages the data that is different from the data having the data type associated with the encryption target as the data type that is associated with an un-encryption target. The data type includes an encryption target and an un-encryption target. The encryption target is data that performs encryption communication. The un-encryption target is data that performs un-encryption communication in which the data is not encrypted. As the data content, items of air conditioning ON/OFF, an operation mode, a set temperature, a set of a wind direction and an air volume, a device model name of the air conditioner 2, an IP address of the air conditioner 2, failure detection information, control information from the air conditioning control apparatus 6, and the like are included. In addition, in the data content, the content of communication data related to air conditioning needed for confidentiality is included.

In the following, the content of each of the pieces of data will be described. The air conditioning ON/OFF is data indicating an operated state or a stopped state of the air conditioner 2. The operation mode is data indicating an operation mode of a heating operation, a cooling operation, or the like related to the air conditioner 2. The set temperature is data on a set temperature that is set in the air conditioner 2. The wind direction and the air volume are setting data on an air volume and a wind direction of the air conditioner 2, respectively. The device model name of the air conditioner 2 is data that is used to identify a device model of the air conditioner 2. The IP address of the air conditioner 2 is data that is used to set the IP address of the communication adapter 3 from the air conditioning control apparatus 6. The failure detection information is data that is used to notify the content related to a failure occurring in the air conditioner 2. The control information that is output from the air conditioning control apparatus 6 is command data that is used to, for example, control and set each of the air conditioners 2 performed by the air conditioning control apparatus 6.

The air conditioning ON/OFF, the operation mode, the set temperature, the wind direction, and the air volume are treated as data having high confidentiality because it is possible to specify, on the basis of these items, that a user is present in a room in which the indoor unit 21 has been installed and specify information related to an individual user including a preference of the user related to a room environment or the like. In contrast, the device model name of the air conditioner 2, the IP address of the air conditioner 2, the failure detection information, and the control information that are output from the air conditioning control apparatus 6 are treated as data having low confidentiality because these items are information irrelevant to the individual user of the air conditioner 2.

The data type table 35 stores therein, in the form of a table, the above described data having high confidentiality as an encryption target and the above described data having low confidentiality as an un-encryption target.

The device model memory 36 stores therein an IP address of the communication adapter 3 and a device name of the air conditioner 2 to which the communication adapter 3 is connected. The device name is, for example, the wall mounted type air conditioner 2A, the duct type air conditioner 2B, the ceiling type air conditioner 2C, or the like. The IP address is an IP address assigned to the communication adapter 3. Furthermore, the IP address is an IP address assigned by a dynamic host configuration protocol (DHCP) control unit 65D, which will be described later, included in the air conditioning control apparatus 6.

The CPU 34 includes a detection unit 34A, a determination unit 34B, a communication control unit 34C, and a control unit 34D. The detection unit 34A detects data that corresponds to a transmission target and that is to be transmitted by the communication adapter 3. The transmission target data is data that is transmitted by the communication adapter 3. The determination unit 34B refers to the data type table 35 on the basis of the data type of the transmission target data, and determines whether or not encryption communication is used for the data that corresponds to the transmission target. If the data type of the data corresponding to the transmission target is an encryption target, the determination unit 34B determines that the data corresponding to the transmission target is communicated by using the encryption communication. If the data type of the data corresponding to the transmission target is an un-encryption target that is different from the data type that is associated with the encryption target, the determination unit 34B determines that the data corresponding to the transmission target is not communicated by using the encryption communication.

The communication control unit 34C is a first control unit that controls the first communication unit 31. If the transmission target data is an encryption target, the communication control unit 34C controls the first communication unit 31 in order to transmit the transmission target data by using the encryption communication. In addition, if the transmission target data is an un-encryption target, the communication control unit 34C controls the first communication unit 31 in order to transmit the transmission target data by using the un-encryption communication. The control unit 34D performs overall control of the communication adapter 3.
<Configuration of Air Conditioning Control Apparatus>

Figure 5:
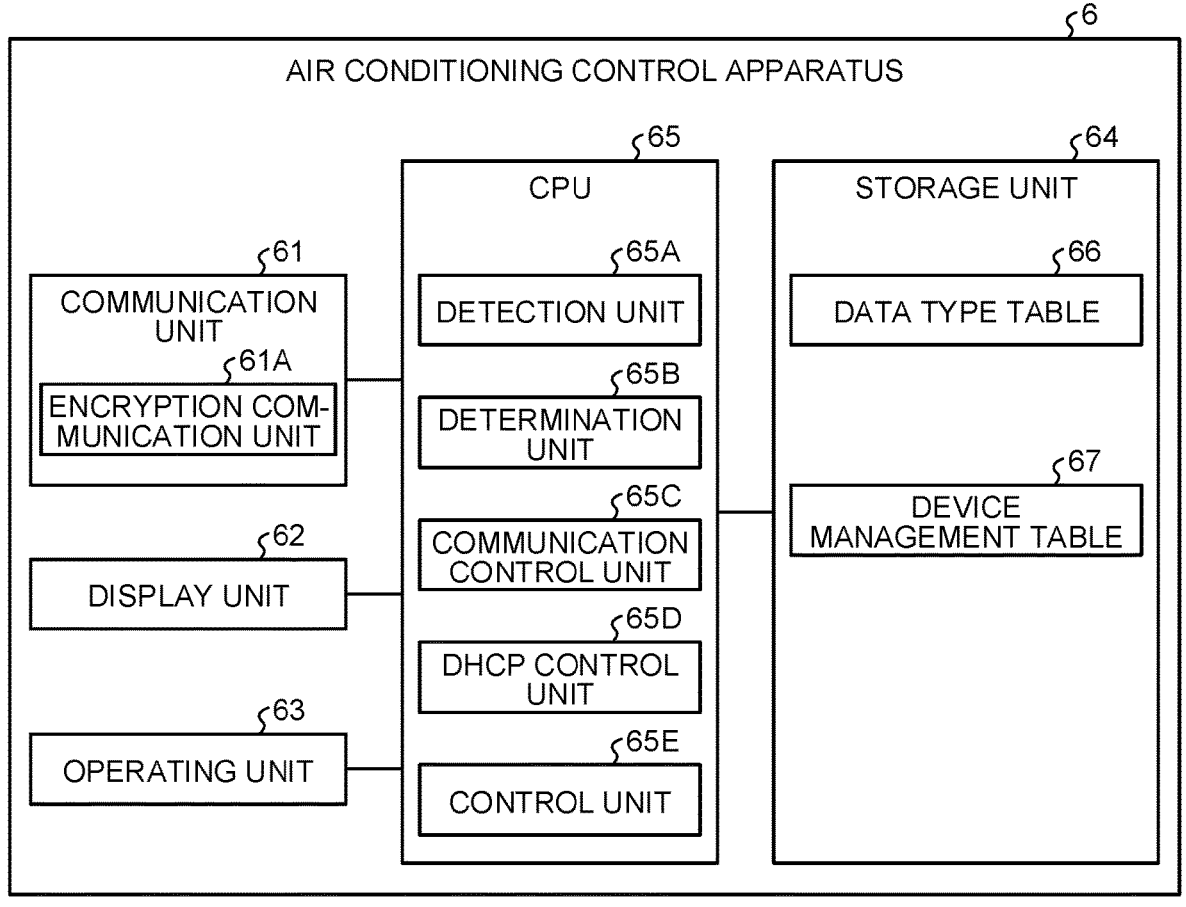
FIG. 5 is a block diagram illustrating one example of a configuration of an air conditioning control apparatus according to the first embodiment.

FIG. 5 is a block diagram illustrating one example of a configuration of the air conditioning control apparatus 6 according to the first embodiment. The air conditioning control apparatus 6 illustrated in FIG. 5 includes a communication unit 61, a display unit 62, an operating unit 63, a storage unit 64, and a CPU 65. The communication unit 61 performs data communication with the communication adapter 3 by using the encryption communication or the un-encryption communication. The communication unit 61 includes an encryption communication unit 61A that performs a function of the encryption communication. The display unit 62 displays various kinds of information on, for example, an operation, a setting status, and the like of the plurality of air conditioners. The operating unit 63 receives an input of an operation received from an operator with respect to the air conditioning control apparatus 6. The storage unit 64 stores therein various kinds of information. The CPU 65 performs overall control of the air conditioning control apparatus 6.

The storage unit 64 includes a data type table 66 and a device management table 67. The data type table 66 is a table that manages the data content associated with each of the data types. The data type table 66 has the same content as the data type table 35 that is included in the communication adapter 3. The data type table 66 manages the data related to an individual user who uses the air conditioner 2 as the data type that is associated with an encryption target, and also manages the data that is different from the data having the data type that is associated with the encryption target as the data type that is associated with an un-encryption target. The device management table 67 is a table that manages the device type and the IP address of the air conditioner 2 that is connected to each of the communication adapters 3. The device type of the air conditioner 2 is, for example, the wall mounted type air conditioner 2A, the duct type air conditioner 2B, the ceiling type air conditioner 2C, or the like. The IP address is an IP address assigned to the communication adapter 3 that is connected to the air conditioner 2.

The CPU 65 includes a detection unit 65A, a determination unit 65B, a communication control unit 65C, the DHCP control unit 65D, and a control unit 65E. The detection unit 65A detects data that corresponds to a transmission target and that is to be transmitted by the air conditioning control apparatus 6. The transmission target data is data that is transmitted by the air conditioning control apparatus 6. The determination unit 65B refers to the data type table 66 on the basis of the data type associated with the transmission target data, and determines whether or not the encryption communication is used for the data corresponding to the transmission target. If the data type of the data corresponding to the transmission target is associated with an encryption target, the determination unit 65B determines that the data corresponding to the transmission target is communicated by using the encryption communication. If the data type of the data corresponding to the transmission target is an un-encryption target that is different from the encryption target, the determination unit 65B determines that the data corresponding to the transmission target is not communicated by using the encryption communication.

The communication control unit 65C is a second control unit that controls the communication unit 61. The DHCP control unit 65D has a DHCP function for assigning an IP address used for communication to each of the communication adapters 3 provided in, for example, a wireless LAN. Furthermore, the DHCP function is able to be turned ON/OFF. The control unit 65E performs overall control of the air conditioning control apparatus 6. The communication control unit 65C includes the DHCP control unit 65D, so that the communication control unit 65C assigns an IP address to each of the communication adapters 3 that are connected to the respective air conditioners 2 (the wall mounted type air conditioner 2A, the duct type air conditioner 2B, the ceiling type air conditioner 2C, etc.). Therefore, the communication control unit 65C forms a sub network with the communication adapters 3 (the air conditioners 2) by using the IP address assigned to each of the communication adapters 3 as a host address.
<Operation of Air Conditioning System>

Figure 6:
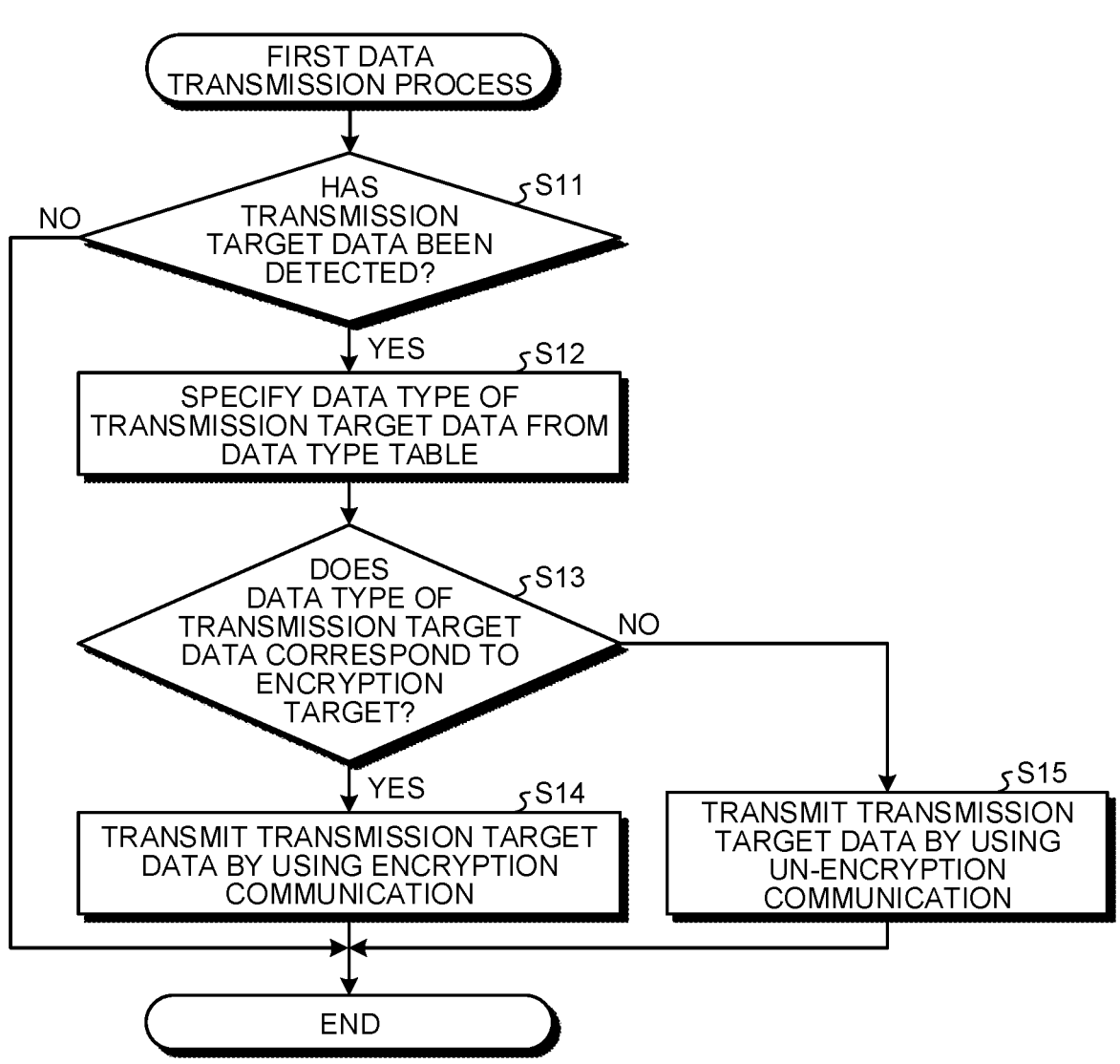
FIG. 6 is a flowchart illustrating one example of a processing operation related to a first data transmission process performed in the communication adapter or the air conditioning control apparatus.

In the following, an operation of the air conditioning system 1 according to the first embodiment will be described. FIG. 6 is a flowchart illustrating one example of a processing operation related to a first data transmission process performed in the communication adapter 3 or the air conditioning control apparatus 6. Furthermore, for convenience of description, a case in which the first data transmission process is performed in the communication adapter 3 will be described as an example; however, the first data transmission process may be performed in the air conditioning control apparatus 6 instead of the communication adapter 3, and appropriate modifications are possible.

The detection unit 34A included in the CPU 34 in the communication adapter 3 illustrated in FIG. 6 determines whether or not data corresponding to a transmission target has been detected (Step S11). Furthermore, the detection unit 34A detects an occurrence of data corresponding to the transmission target. If the data corresponding to the transmission target has been detected (Yes at Step S11), the determination unit 34B included in the CPU 34 refers to the data type table 35 and specifies the data type associated with the transmission target data (Step S12). Furthermore, the data type is, for example, an encryption target or an un-encryption target.

The determination unit 34B determines whether or not the data type of the transmission target data is the encryption target (Step S13). If the data type of the transmission target data is the encryption target (Yes at Step S13), the communication control unit 34C controls the first communication unit 31 in order to transmit the transmission target data by using the encryption communication (Step S14), and ends the processing operation illustrated in FIG. 6. Furthermore, the encryption communication performs data communication by using the TLS method used in HTTP. Then, if the air conditioning control apparatus 6 receives the data on the basis of the encryption communication from the communication adapter 3, the air conditioning control apparatus 6 decodes the encrypted data. Consequently, the communication adapter 3 encrypts the transmission target data and communicates the encrypted data to the air conditioning control apparatus 6, so that it is possible to protect the information related to the individual user of the air conditioner 2 that is connected to the communication adapter 3 and ensure privacy protection of the user. In addition, if the detection unit 34A does not detect data corresponding to a transmission target (No at Step S11), the detection unit 34A ends the processing operation illustrated in FIG. 6.

If the data type of the transmission target data is not the encryption target (No at Step S13), the communication control unit 34C transmits the transmission target data by using the un-encryption communication (Step S15), and ends the processing operation illustrated in FIG. 6. Furthermore, the un-encryption communication performs the data communication by using the UDP method. Then, if the air conditioning control apparatus 6 receives the data on the basis of the un-encryption communication from the communication adapter 3, the air conditioning control apparatus 6 receives unencrypted data. Consequently, the communication adapter 3 does not encrypt the transmission target data with the air conditioning control apparatus 6, so that it is possible to reduce communication load needed for transmission of the transmission target data.

In addition, the detection unit 65A included in the CPU 65 in the air conditioning control apparatus 6 determines whether or not the data corresponding to the transmission target has been detected (Step S11). If the data corresponding to the transmission target has been detected (Yes at Step S11), the determination unit 65B included in the CPU 65 refers to the data type table 66 and specifies the data type of the transmission target data (Step S12). Furthermore, the data type is, for example, an encryption target or an un-encryption target.

The determination unit 65B determines whether or not the data type of the transmission target data is an encryption target (Step S13). If the data type of the transmission target data is an encryption target (Yes at Step S13), the communication control unit 65C controls the communication unit 61 in order to transmit the transmission target data by using the encryption communication (Step S14), and ends the processing operation illustrated in FIG. 6. Furthermore, the encryption communication accordingly performs the data communication by using the TLS method used in HTTP. Then, if the communication adapter 3 receives the data on the basis of the encryption communication from the air conditioning control apparatus 6, the communication adapter 3 decodes the encrypted data. Consequently, the air conditioning control apparatus 6 encrypts the transmission target data and communicates the encrypted data to the communication adapter 3, so that it is possible to protect the information related to the individual user of the air conditioner 2 that is connected to the communication adapter 3 and ensure privacy protection of the user. In addition, if the detection unit 65A does not detect the data corresponding to a transmission target (No at Step S11), the detection unit 65A ends the processing operation illustrated in FIG. 6.

If the data type of the transmission target data is not the encryption target (No at Step S13), the communication control unit 65C transmits the transmission target data by using the un-encryption communication (Step S15), and ends the processing operation illustrated in FIG. 6. Furthermore, the un-encryption communication accordingly performs the data communication by using the UDP method. Then, if the communication adapter 3 receives the data on the basis of the un-encryption communication from the air conditioning control apparatus 6, the communication adapter 3 receives unencrypted data. Consequently, the air conditioning control apparatus 6 does not encrypt the transmission target data with the communication adapter 3, so that it is possible to reduce the communication load needed for the transmission of the transmission target data.

Effects of the First Embodiment

The un-encryption communication is used for the information that is irrelevant to the individual user of the air conditioner 2, it is possible to reduce the communication load that is needed for the data communication performed by the air conditioner 2 and that is placed on the communication adapter 3 side and reduce the communication traffic in the wireless LAN. In other words, in the case where the encryption communication is used, for example, an amount of data for the encryption communication including a handshake, a key exchange, and the like is increased, and the number of times communication including the key exchange and the like is performed is increased. In contrast, in the case where the un-encryption communication is used, for example, an amount of data for the encryption communication including a handshake, a key exchange, and the like is eliminated and the number of times the communication is performed is thus eliminated, it is possible to reduce the communication load placed on the communication adapter 3 side and reduce the communication traffic in the wireless LAN.

In addition, of the data related to the operation of the air conditioner 2, the information indicating that the user is present and the information related to the individual user, such as a preference of the user related to a room environment, are communicated by using the encryption communication, so that it is possible to protect the privacy of the user.

By classifying data into data that is to be encrypted and data that is not to be encrypted in accordance with the data content of the transmission target data and by reducing the amount of data to be encrypted and the number of times a handshake related to the encryption communication is performed, it is possible to reduce the load placed on the first communication unit 31 (the communication unit 61). Furthermore, by reducing the amount of data to be encrypted and the number of times a handshake performed at the time of the encryption communication, it is possible to suppress the communication load placed on the wireless LAN. Furthermore, by reducing the amount of data used for the encryption communication corresponding to the load placed on the first communication unit 31 (the communication unit 61), it is possible to configure the hardware, such as the first communication unit 31 (the communication unit 61), at a low price. In addition, even if an open network, such as a wireless LAN, is used, the privacy of the user who uses the air conditioner 2 is maintained.

In addition, a case has been described as an example in which, in the air conditioning system 1 according to the first embodiment, in the case where the data type of the transmission target data is an encryption target, the transmission target data is transmitted by using the encryption communication, whereas, in the case where the data type of the transmission target data is an un-encryption target, the transmission target data is transmitted by using the un-encryption communication. However, it may be possible to determine whether or not the data corresponding to the transmission target is communicated by using the encryption communication instead of the data type of the transmission target data on the basis of a congestion state of the communication of the air conditioning system 1, and an embodiment thereof will be described below as a second embodiment. Furthermore, by assigning the same reference numerals to components having the same configuration as those in the air conditioning system 1 according to the first embodiment, overlapped descriptions of the configuration and the operation thereof will be omitted.

Second Embodiment

<Configuration of Communication Adapter>

Figures 7, 8:
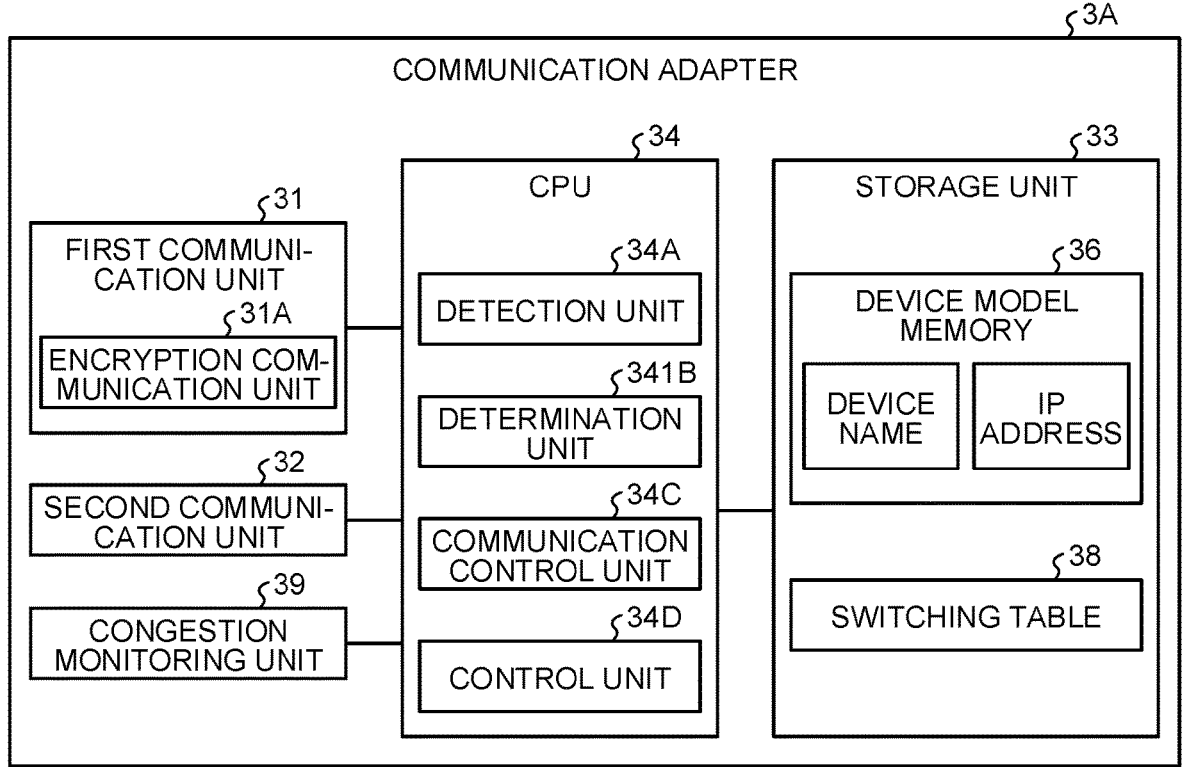
FIG. 7 is a block diagram illustrating one example of a configuration of a communication adapter according to a second embodiment.
FIG. 8 is a diagram illustrating one example of a switching table.

FIG. 7 is a block diagram illustrating one example of a configuration of a communication adapter 3A according to the second embodiment. The communication adapter 3A illustrated in FIG. 7 includes, in addition to the first communication unit 31, the second communication unit 32, the storage unit 33, and the CPU 34, a congestion monitoring unit 39 that is a monitoring unit that monitors a congestion state of the data communication performed in the air conditioning system 1.

The congestion monitoring unit 39 monitors a congestion state of the data communication performed in the air conditioning system 1, and calculates a congestion index that indicates the congestion state. The congestion index is calculated from a packet loss count obtained in, for example, a predetermined period of time. The congestion monitoring unit 39 determines that a packet loss has occurred in the case where a retransmission time-out occurs without receiving an ACK that is a response signal indicating that a reception side has received data within a predetermined period of time after, for example, a start of data transmission. In this case, the same data is retransmitted. The congestion monitoring unit 39 calculates a congestion index C from a packet loss count with respect to a predetermined amount of data transmission (for example, 1 M byte). The congestion index C may be calculated by multiplying a predetermined coefficient (for example, $10^4$) by a value obtained by dividing, for example, a packet loss count by a predetermined data communication volume. As the packet loss count is increased, the value of the congestion index is increased.

The storage unit 33 includes a switching table 38 instead of the data type table 35. The switching table 38 is a table that stores therein the data type of the data corresponding to the transmission target is switched from the encryption communication to the un-encryption communication in accordance with a value of the congestion index C. FIG. 8 is a diagram illustrating one example of the switching table 38. Furthermore, it is assumed that the congestion index C varies in a range of, for example, 0 to 4 as a result of setting the predetermined coefficient described above. In the case where the congestion index C illustrated in FIG. 8 is $3 \leq C \leq 4$, the data type that is associated with the un-encryption target and that is related to the data corresponding to the transmission target to be switched from the encryption communication to the un-encryption communication is associated with, for example, the air conditioning ON/OFF and a set of the wind direction and the air volume. In the case where the congestion index C is $2 \leq C \leq 4$, the data type of the un-encryption target is associated with, for example, the operation mode and the set temperature. In the case where the congestion index C is $1 \leq C \leq 4$, the data type associated with the un-encryption target is associated with, for example, the device model name, the device model type, and the failure detection information. Generally speaking, as an increase in the value of the congestion index C, an amount of the data to be switched to the un-encryption communication is increased.

In addition, the data type is constituted such that confidentiality of data is divided into three levels (high, medium, and low) in accordance with the degree associated with the personal information on the user, the range of the congestion index C is assigned in accordance with the levels. For example, the air conditioning ON/OFF and the set of the wind direction and the air volume are items that are directly associated with presence/absence information that is the information on the individual user, so that the confidentiality of these items is set to high. For example, the operation mode and the set temperature reflect the preference of the user, but the values thereof are held even at the time of air conditioning OFF, so that it is assumed that the relation with the information on the individual user is not so high, and thus, the confidentiality is set to medium. For example, the device model name, the device model type, and the failure detection information are information irrelevant to the individual user, so that the confidentiality is set to low. On the basis of this way of thinking, the switching table 38 is generated such that the encryption communication is sequentially switched to the un-encryption communication in a sequential manner from the data type having low confidentiality to the data type having high confidentiality in accordance with an increase in the value of the congestion index C.

Furthermore, the CPU 34 includes a determination unit 341B instead of the determination unit 34B. The determination unit 341B determines whether or not the data corresponding to the transmission target is communicated by using the encryption communication on the basis of the congestion index that indicates the congestion state. Specifically, the determination unit 341B refers to the switching table 38 and determines whether or not the data corresponding to the transmission target is switched from the encryption communication to the un-encryption communication in accordance with the congestion index C. Then, the determination unit 341B refers to the switching table 38, and specifies the data that is communicated by using the un-encryption communication in accordance with the current congestion index C.

In the case where the congestion index C is $C<1$, the determination unit 341B determines that the data corresponding to the transmission target included in all of the data types is communicated by using the encryption communication. In the case where the congestion index C is $1 \leq C \leq 4$, the determination unit 341B refers to the switching table 38, and determines that the data associated with the device model name, the device model type, and the failure detection information is communicated by using the un-encryption communication. In the case where the congestion index C is $2 \leq C \leq 4$, the determination unit 341B determines that the data associated with the operation mode and the set temperature is communicated by using the un-encryption communication. In the case where the congestion index C is $3 \leq C \leq 4$, the determination unit 341B determines that the data associated with the air conditioning ON/OFF and the set of the wind direction and the air volume is communicated by using the un-encryption communication.

<Configuration of Air Conditioning Control Apparatus>

Figure 9:
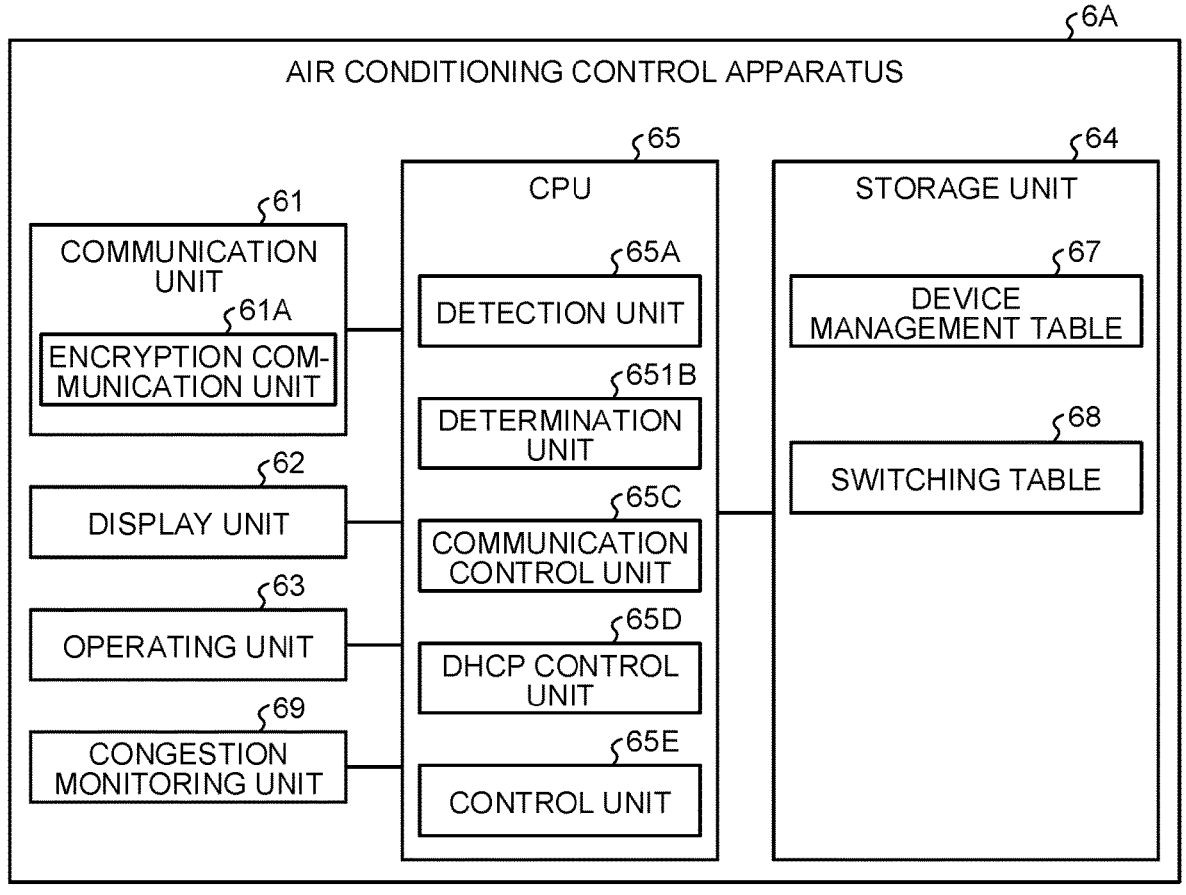
FIG. 9 is a block diagram illustrating one example of a configuration of an air conditioning control apparatus according to the second embodiment.

FIG. 9 is a block diagram illustrating one example of a configuration of an air conditioning control apparatus 6A according to the second embodiment. The air conditioning control apparatus 6A illustrated in FIG. 9 includes a congestion monitoring unit 69 in addition to the communication unit 61, the display unit 62, the operating unit 63, the storage unit 64, and the CPU 65. The storage unit 64 includes a switching table 68 instead of the data type table 66. The switching table 68 is a table that switches the data corresponding to the transmission target from the encryption communication to the un-encryption communication in each of the ranges of the congestion index and that manages the data type of the un-encryption target. The switching table 68 has the same content as that of the switching table 38 included in the communication adapter 3A.

The CPU 65 includes a determination unit 651B instead of the determination unit 65B. The determination unit 651B determines whether or not the data corresponding to the transmission target is to be switched from the encryption communication to the un-encryption communication in accordance with the congestion index C obtained from the congestion monitoring unit 69. In the case where the congestion index C is C<1, the determination unit 651B determines that the data corresponding to the transmission target included in all of the data types is communicated by using the encryption communication. In the case where the congestion index C is 1≤C≤4, the determination unit 651B refers to the switching table 38, and determines that the data associated with the device model name, the device model type, and the failure detection information is communicated by using the un-encryption communication. In the case where the congestion index C is 2≤C≤4, the determination unit 651B determines that the data associated with the operation mode and the set temperature is communicated by using the un-encryption communication. In the case where the congestion index C is 3≤C≤4, the determination unit 651B determines that the data associated with the air conditioning ON/OFF and the set of the wind direction and the air volume is communicated by using the un-encryption communication.

<Operation of Air Conditioning System>

Figure 10:
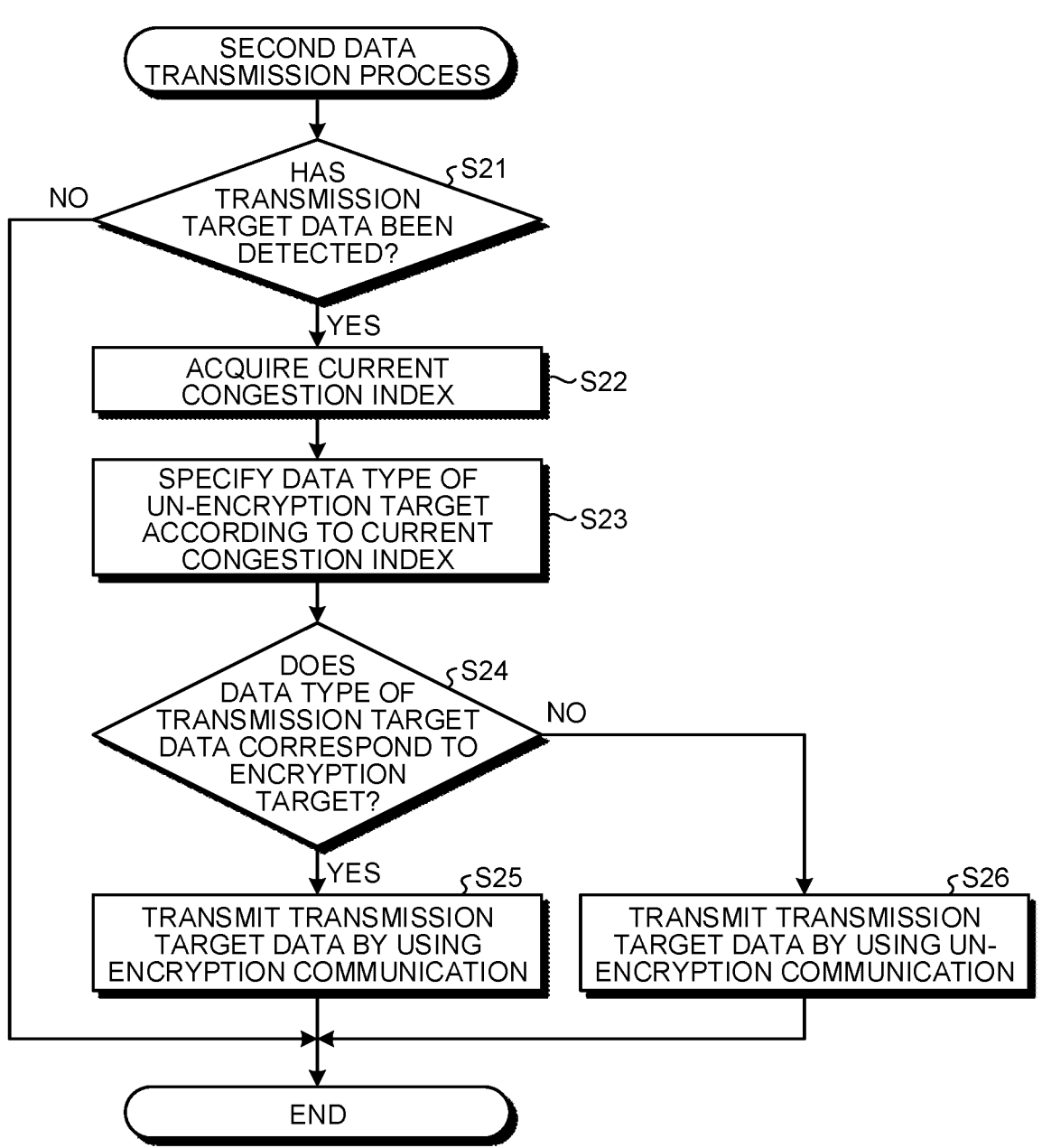
FIG. 10 is a flowchart illustrating one example of a processing operation related to a second data transmission process performed in the communication adapter or the air conditioning control apparatus.

In the following, an operation of the air conditioning system 1 according to the second embodiment will be described. FIG. 10 is a flowchart illustrating one example of a processing operation related to a second data transmission process performed in the communication adapter 3A or the air conditioning control apparatus 6A. Furthermore, for convenience of description, a case in which the second data transmission process is performed in the communication adapter 3A will be described as an example; however, the second data transmission process may be performed in the air conditioning control apparatus 6A instead of the communication adapter 3A, and appropriate modifications are possible.

The detection unit 34A included in the CPU 34 in the communication adapter 3A illustrated in FIG. 10 determines whether or not the data corresponding to the transmission target has been detected (Step S21). Furthermore, the detection unit 34A detects an occurrence of data corresponding to a transmission target. If the data corresponding to the transmission target has been detected (Yes at Step S21), the determination unit 341B included in the CPU 34 acquires the current congestion index C from the congestion monitoring unit 39 (Step S22).

The determination unit 341B refers to the switching table 38, and specifies the data type that is associated with the un-encryption target and that is in accordance with the congestion index C (Step S23). Furthermore, the data type is the type of the data corresponding to, for example, an encryption target or an un-encryption target. The determination unit 341B determines whether or not the data type of the transmission target data is an encryption target (Step S24).

If the data type of the transmission target data is an encryption target (Yes at Step S24), the communication control unit 34C controls the first communication unit 31 in order to transmit the transmission target data by using the encryption communication (Step S25), and ends the processing operation illustrated in FIG. 10. Furthermore, for the data communication, for example, an encryption protocol, such as TLS for HTTP, is used. Then, if the air conditioning control apparatus 6A receives the data on the basis of the encryption communication from the communication adapter 3A, the air conditioning control apparatus 6A decodes the encrypted data. Consequently, the communication adapter 3A performs communication with the air conditioning control apparatus 6A by encrypting the transmission target data, so that it is possible to protect the information related to the individual user of the air conditioner 2 that is connected to the communication adapter 3A and ensure privacy protection of the user. If the detection unit 34A does not detect the data corresponding to the transmission target (No at Step S21), the detection unit 34A ends the processing operation illustrated in FIG. 10.

If the data type of the transmission target data is not the encryption target (No at Step S24), the communication control unit 34C transmits the transmission target data by using the un-encryption communication (Step S26). Then, the processing operation illustrated in FIG. 10 has been completed. Furthermore, for the data communication, for example, an un-encryption protocol, such as a UDP, is used. Then, if the air conditioning control apparatus 6A receives the data on the basis of the un-encryption communication from the communication adapter 3A, the air conditioning control apparatus 6A receives unencrypted data. Consequently, the communication adapter 3A does not encrypt the transmission target data with the air conditioning control apparatus 6A, so that it is possible to suppress the communication data volume and reduce an occurrence of congestion.

In other words, the data type associated with the un-encryption target is specified on the basis of the congestion index C by using the switching table 38. In the case where the congestion index C of the data communication performed in the air conditioning system 1 is 1≤C≤4, by unencrypting the data having low confidentiality associated with, for example, the device model name, the device model type, and the failure detection information, the communication data volume is decreased, the communication traffic and the communication load are reduced, and an occurrence of congestion is suppressed.

In addition, in the case where the congestion index C of the data communication performed in the air conditioning system 1 is 2≤C≤4, in addition to unencrypting the data having low confidentiality, the data having medium confidentiality associated with, for example, the operation mode and the set temperature is unencrypted, so that an amount of data used in the encryption communication is further decreased, the communication traffic and the communication load are further reduced, and an occurrence of congestion is suppressed.

Furthermore, for example, in the case where the congestion index C of the data communication performed in the air conditioning system 1 is 3≤C≤4, in addition to the data having low confidentiality and the data having medium confidentiality, the data having high confidentiality associated with, for example, the air conditioning ON/OFF and the set of the wind direction and the air volume is also unencrypted. As a result, all of the pieces of communication correspond to the un-encryption communication, both of the communication traffic and the communication load are reduced to a maximum extent, and an occurrence of congestion is suppressed.

Furthermore, in the case where the congestion index C of the data communication performed in the air conditioning system 1 is C<1, all of the pieces of data are encrypted. The value of the congestion index C is small, so that congestion does not occur.

In addition, the detection unit 65A included in the CPU 65 in the air conditioning control apparatus 6A determines whether or not the data corresponding to the transmission target has been detected (Step S21). If the determination unit 651B included in the CPU 65 detects the data corresponding to the transmission target (Yes at Step S21), the determination unit 651B acquires the current congestion index from the congestion monitoring unit 69 (Step S22).

The determination unit 651B refers to the switching table 68, and specifies the data type associated with the un-encryption target in accordance with the congestion index (Step S23). Furthermore, the data type is, for example, an encryption target or an un-encryption target. The determination unit 651B determines whether or not the data type of the transmission target data is the encryption target (Step S24).

If the data type of the transmission target data is the encryption target (Yes at Step S24), the communication control unit 65C controls the communication unit 61 in order to transmit the transmission target data by using the encryption communication (Step S25), and ends the processing operation illustrated in FIG. 10. Furthermore, for the data communication, the data communication is performed by using TLS for HTTP corresponding to the encryption communication. Then, if the data is received from the air conditioning control apparatus 6A on the basis of the encryption communication, the communication adapter 3A decodes the encrypted data. Consequently, the air conditioning control apparatus 6A communicates with the communication adapter 3A by encrypting the transmission target data, so that it is possible to protect the information related to the individual user of the air conditioner 2 that is connected to the communication adapter 3A and ensure privacy protection of the user. In addition, if the detection unit 65A does not detect the data corresponding to the transmission target (No at Step S21), the detection unit 65A ends the processing operation illustrated in FIG. 10.

Figure 11:
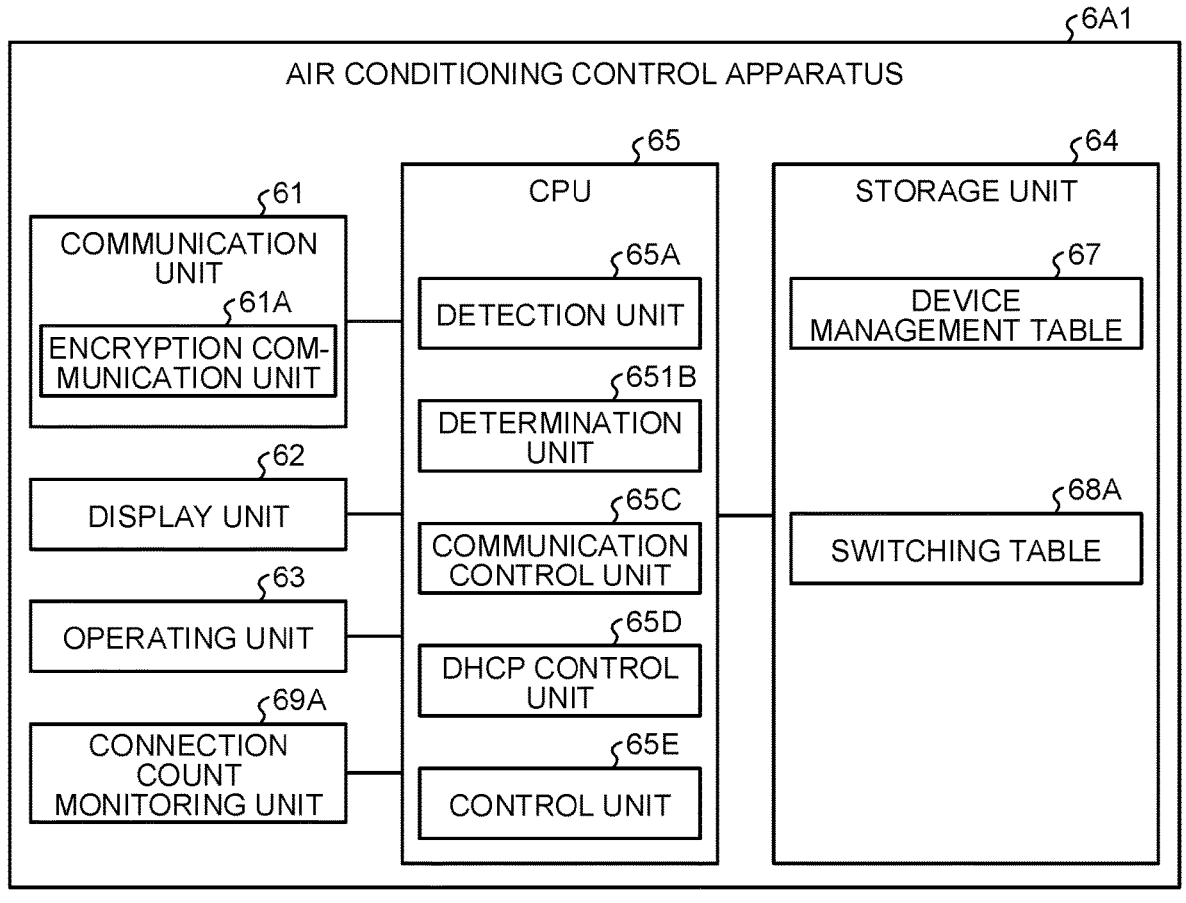
FIG. 11 is a block diagram illustrating one example of a configuration of an air conditioning control apparatus according to a third embodiment.

If the data type of the transmission target data is not the encryption target (No at Step S24), the communication control unit 65C transmits the transmission target data by using the un-encryption communication (Step S26), and ends the processing operation illustrated in FIG. 11. Furthermore, for the data communication, the data communication is performed by using a UDP that is the un-encryption communication. Then, if the communication adapter 3A receives the data on the basis of the un-encryption communication from the air conditioning control apparatus 6A, the communication adapter 3A receives the unencrypted data. Consequently, the air conditioning control apparatus 6A does not encrypt the transmission target data with the communication adapter 3A, so that it is possible to reduce the communication load needed for the transmission of the transmission target data.

Effects of the Second Embodiment

By sequentially unencrypting the pieces of communication data associated with the respective types in accordance with congestion of the network, such as a wireless LAN, it is possible to decrease the communication load placed on the air conditioning control apparatus 6A and the communication adapter 3A while maintaining the confidentiality of the data. In addition, it is possible to reduce the communication traffic in the network and suppress an occurrence of congestion.

By classifying the transmission target data into the encryption target and the un-encryption target in accordance with the congestion state of the air conditioning system and by reducing an amount of data to be encrypted and the number of times a handshake performed every time the encryption communication is started, it is possible to reduce the load placed on the first communication unit 31 (the communication unit 61). Furthermore, by reducing the amount of data to be encrypted and the number of times a handshake performed at the time of encryption communication, it is possible to suppress the communication load placed on a wired LAN or a wireless LAN. Furthermore, by reducing the amount of data used for the encryption communication corresponding to the load placed on the first communication unit 31 (the communication unit 61), it is possible to configure the hardware, such as the first communication unit 31 (the communication unit 61), at a low price. In addition, even if the wired LAN or the wireless used for the open network is used for the communication, it is possible to maintain the privacy of the user who uses the air conditioner 2.

In addition, for convenience of description, a case has been described as an example in which the congestion monitoring unit 39 (69) detects the congestion state of the data communication on the basis of the packet loss count obtained in a predetermined period of time. However, the congestion monitoring unit 39 (69) may monitor the output delay time that is the latency time of a transfer of the transmission target data and detect a congestion state of the data communication on the basis of the output delay time, and appropriate modifications are possible.

A case has been described as an example in which the communication adapter 3A includes the congestion monitoring unit 39 as a built-in unit, and the air conditioning control apparatus 6A includes the congestion monitoring unit 69 as a built-in unit; however, only the air conditioning control apparatus 6A may include the congestion monitoring unit 69 as a built-in unit, and, in this case, the air conditioning control apparatus 6A may notify each of the communication adapters 3A of the congestion index that has been detected by the congestion monitoring unit 69, and appropriate modifications are possible.

In addition, a case has been described as an example in which, in the air conditioning system 1 according to the first embodiment, in the case where the data type of the transmission target data is the encryption target, the transmission target data is transmitted by using the encryption communication, whereas, in the case where the data type of the transmission target data is the un-encryption target, the transmission target data is transmitted by using the un-encryption communication. However, it may be possible to determine whether or not the data corresponding to the transmission target is communicated by using the encryption communication on the basis of, instead of the data type of the transmission target data, the connection count of the communication adapters 3 connected to the air conditioners 2 included in the air conditioning system 1, and an embodiment thereof will be described as a third embodiment. Furthermore, by assigning the same reference numerals to components having the same configuration as those in the air conditioning system 1 according to the first embodiment, overlapped descriptions of the configuration and the operation thereof will be omitted.

Third Embodiment

<Configuration of Air Conditioning Control Apparatus>
FIG. 11 is a block diagram illustrating one example of a configuration of an air conditioning control apparatus 6A1 according to the third embodiment. The air conditioning control apparatus 6A1 illustrated in FIG. 11 includes a connection count monitoring unit 69A in addition to the communication unit 61, the display unit 62, the operating unit 63, the storage unit 64, and the CPU 65. The connection count monitoring unit 69A monitors a count number of communication adapters 3A1 associated with the respective air conditioners 2 included in the air conditioning system 1. The connection count monitoring unit 69A assigns an IP address to each of the communication adapters 3A1 at the time of the initial communication with each of the communication adapters 3A1 by way of, for example, the DHCP control unit 65D, so that it is assumed that a count number n of the communication adapters 3A1 included in the air conditioning system 1 is grasped on the basis of the number of times the IP address is assigned to each of the communication adapters 3A1 included in the air conditioning system 1. The storage unit 64 includes a switching table 68A instead of the data type table 66. Furthermore, as illustrated in FIG. 1, a single air conditioner is connected to a single communication adapter. Therefore, a count number n of the communication adapters 3A1 is equal to the count number of the air conditioners 2, and a count number of the air conditioners 2 is also denoted by n.

Figures 12, 13:
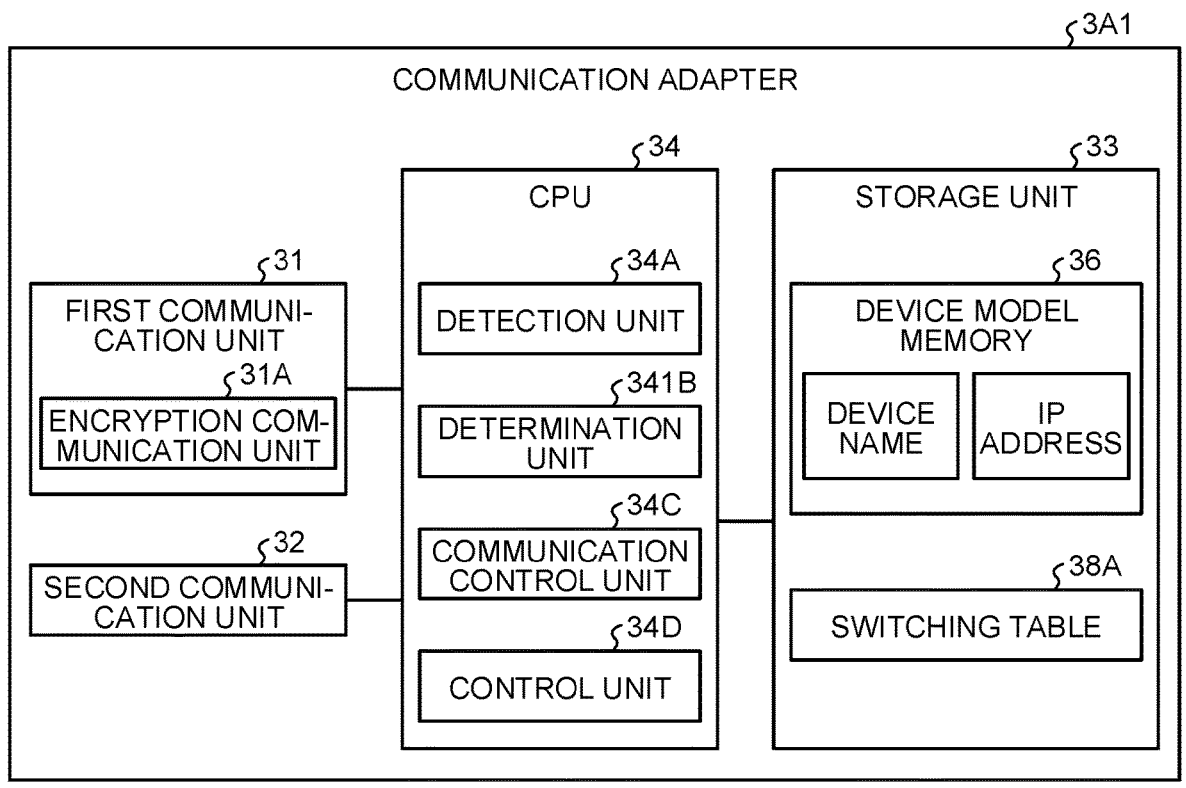
FIG. 12 is a diagram illustrating one example of a switching table.
FIG. 13 is a block diagram illustrating one example of a configuration of a communication adapter according to the third embodiment.

The switching table 68A is a table that stores therein the data type of the data corresponding to the transmission target to be switched from the encryption communication to the un-encryption communication in accordance with the count number of the communication adapters 3A1 included in the air conditioning system 1. FIG. 12 is a diagram illustrating one example of the switching table 68A. Furthermore, for convenience of description, it is assumed that the connection count n is the count number of the communication adapters 3A1 included in the air conditioning system 1 denoted by, for example, 128. In the case where the count number n illustrated in FIG. 12 is $110 < n \le 128$, it is assumed that the data type that is associated with the un-encryption target and that is related to the data corresponding to the transmission target to be switched from the encryption communication to the un-encryption communication is associated with, for example, the air conditioning ON/OFF and the set of the wind direction and the air volume. In the case where the connection count n is $100 < n \le 128$, the data type of the un-encryption target is associated with, for example, the operation mode and the set temperature. In the case where the connection count n is $80 < n \le 128$, the data type of the un-encryption target is associated with, for example, the device model name, the device model type, and the failure detection information. Generally speaking, in the case where the count number n of the communication adapters 3A1 is larger than a predetermined threshold (here, 80, 100, and 110), the encryption communication is switched to the un-encryption communication.

In addition, the data type is constituted such that confidentiality of data is divided into three levels (high, medium, and low) in accordance with the degree related to the personal information on the user, and the range of the count number n of the communication adapters 3A1 is assigned in accordance with the divided levels. For example, the air conditioning ON/OFF and the set of the wind direction and the air volume are items that are directly associated with presence/absence information that is the information on the individual user, so that the confidentiality of these items is set to high. For example, the operation mode and the set temperature are items that reflect the preference of the user, but the values thereof are held even at the time of the air conditioning OFF, so that it is assumed that the relation with the information on the individual user is not so high, and thus, the confidentiality is set to medium. For example, the device model name, the device model type, and the failure detection information are items that indicate information irrelevant to the individual user, so that the confidentiality is set to low. On the basis of this way of thinking, the switching table 68A is generated such that the encryption communication is sequentially switched to the un-encryption communication in a sequential manner from the data type having low confidentiality to the data type having high confidentiality in accordance with an increase in the count number n of the communication adapters 3A1.

Furthermore, the CPU 65 includes the determination unit 651B instead of the determination unit 65B. The determination unit 651B determines whether or not the data corresponding to the transmission target is communicated by using the encryption communication in order to switch the encryption communication with respect to the data to the un-encryption communication in accordance with an increase in the count number n of the communication adapter 3A1. Then, the determination unit 651B refers to the switching table 68A, and specifies the data that is communicated by using the un-encryption communication in accordance with the current count number n of the communication adapters 3A1.

In the case where the count number n of the communication adapters 3A1 is n<80, the determination unit 651B determines that the data type of all of the pieces of the data corresponding to the transmission target is the encryption communication. In the case where the count number n of the communication adapters 3A1 is $80 < n \le 128$, the determination unit 651B refers to the switching table 68A, and determines that, as the data type associated with the un-encryption target, data associated with the device model name, the device model type, and the failure detection information is communicated by using the un-encryption communication. In the case where the count number n of the communication adapters 3A1 is $100 < n \le 128$, the determination unit 651B determines that, as the data type associated with the un-encryption target, the data associated with the operation mode and the set temperature is communicated by using the un-encryption communication. In the case where the connection count n is $110 < n \le 128$, the determination unit 651B determines that, as the data type of the un-encryption target, the data associated with the air conditioning ON/OFF and the set of the wind direction and the air volume is communicated by using the un-encryption communication.

In addition, the communication unit 61 periodically transmit, to the communication adapter 3A1 associated with each of the air conditioners 2, the count number n of the communication adapters 3A1 corresponding to the monitoring result obtained by the connection count monitoring unit 69A.

<Configuration of Communication Adapter>

FIG. 13 is a block diagram illustrating one example of a configuration of the communication adapter 3A1 according to the third embodiment. The communication adapter 3A1 illustrated in FIG. 13 includes the first communication unit 31, the second communication unit 32, the storage unit 33, and the CPU 34. The storage unit 33 includes a switching table 38A instead of the data type table 35. The switching table 38A is a table that switches the data corresponding to the transmission target from the encryption communication to the un-encryption communication in accordance with the count number n of the communication adapters 3A1 and that manages the data type of the un-encryption target. The switching table 38A has the same content as that of the switching table 68A included in the air conditioning control apparatus 6A1.

The CPU 34 acquires the count number n of the communication adapters 3A1 from the air conditioning control apparatus 6A1 by way of the first communication unit 31. The CPU 34 includes a determination unit 341B instead of the determination unit 34B. In the case where the connection count n is n<80, the determination unit 341B determines that the data type of all of the pieces of data corresponding to the transmission target is the encryption communication. In the case where the connection count n is 80<n≤128, the determination unit 341B refers to the switching table 38A, and determines that the data associated with the device model name, the device model type, and the failure detection information is communicated by using the un-encryption communication. In the case where the connection count n is 100<n≤128, the determination unit 341B refers to the switching table 38A, and determines that the data associated with the operation mode and the set temperature is communicated by using the un-encryption communication. In the case where the connection count n is 110<n≤128, the determination unit 341B determines that the data associated with the air conditioning ON/OFF and the set of the wind direction and the air volume is communicated by using the un-encryption communication.

<Operation of Air Conditioning System>

Figure 14:
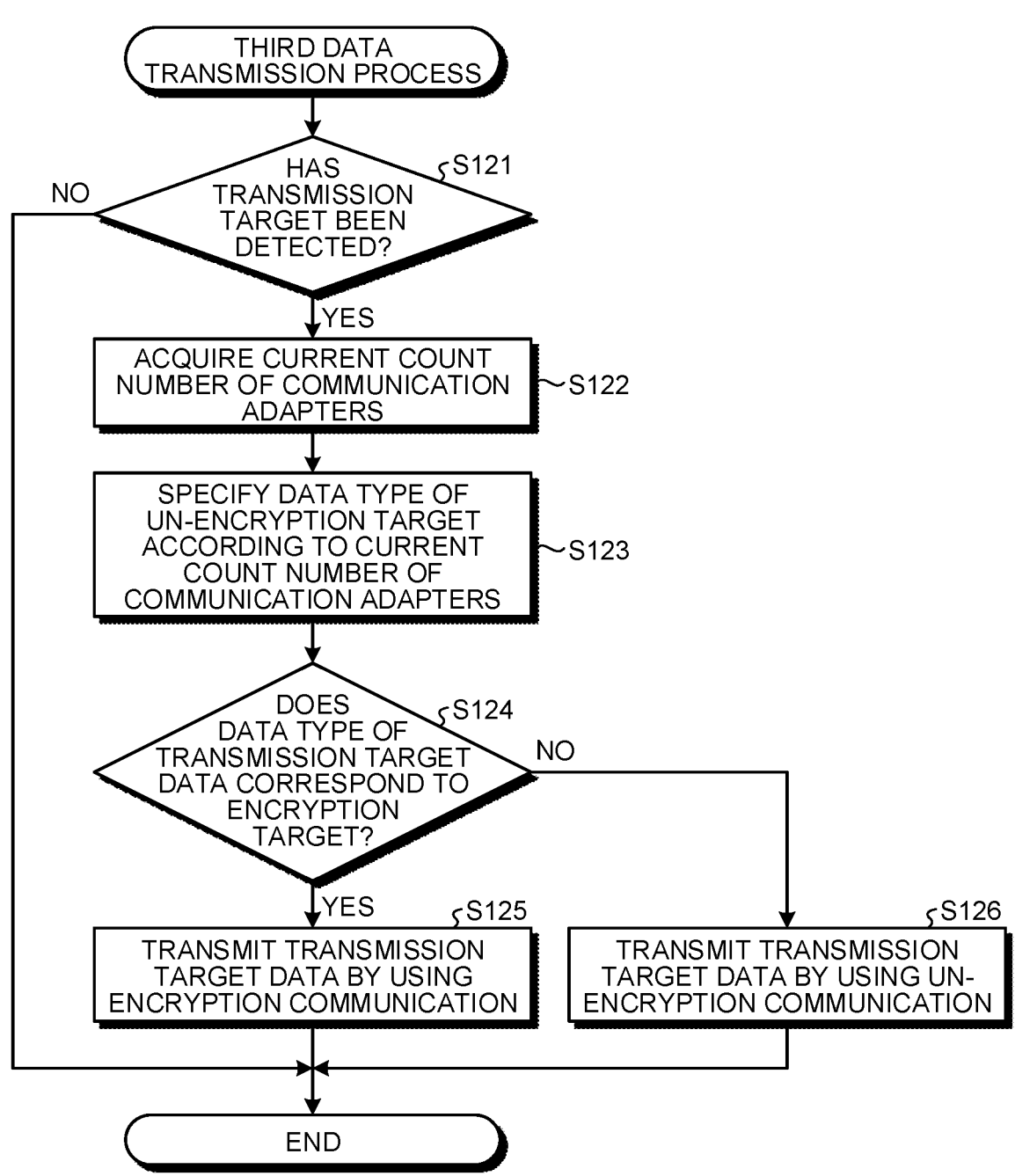
FIG. 14 is a flowchart illustrating one example of a processing operation related to a third data transmission process performed in the communication adapter or the air conditioning control apparatus.

In the following, an operation of the air conditioning system 1 according to the third embodiment will be described. FIG. 14 is a flowchart illustrating one example of a processing operation related to a third data transmission process performed in the air conditioning control apparatus 6A1 or the communication adapter 3A1. Furthermore, for convenience of description, a case in which the third data transmission process is performed in the air conditioning control apparatus 6A1 will be described as an example; however, the third data transmission process may be performed in the communication adapter 3A1 instead of the air conditioning control apparatus 6A1, and appropriate modifications are possible.

The detection unit 65A included in the CPU 65 in the air conditioning control apparatus 6A1 illustrated in FIG. 14 determines whether or not data corresponding to the transmission target has been detected (Step S121). Furthermore, the detection unit 65A detects an occurrence of data corresponding to a transmission target. If the data corresponding to the transmission target has been detected (Yes at Step S121), the determination unit 651B included in the CPU 65 acquires the current count number n of the communication adapters 3A1 from the connection count monitoring unit 69A (Step S122).

The determination unit 651B refers to the switching table 68A, and specifies the data type that is associated with the un-encryption target and that is in accordance with the current count number n of the communication adapters 3A1 (Step S123). Furthermore, the data type is the type of data corresponding to, for example, an encryption target or an un-encryption target. The determination unit 651B determines whether or not the data type of the transmission target data is an encryption target (Step S124).

If the data type of the transmission target data is an encryption target (Yes at Step S124), a communication control unit 64C controls the communication unit 61 in order to transmit the transmission target data by using the encryption communication (Step S125), and ends the processing operation illustrated in FIG. 14. Furthermore, for the data communication, for example, an encryption protocol, such as TLS for HTTP, is used. Then, if the communication adapter 3A1 receives the data on the basis of the encryption communication from the air conditioning control apparatus 6A1, the communication adapter 3A1 decodes the encrypted data. Consequently, the air conditioning control apparatus 6A1 performs communication with the communication adapter 3A1 by encrypting the transmission target data, so that it is possible to protect the information related to the individual user of the air conditioner 2 that is connected to the air conditioning control apparatus 6A1 and ensure privacy protection of the user. In addition, if the detection unit 65A does not detects the data corresponding to the transmission target (No at Step S121), the detection unit 65A ends the processing operation illustrated in FIG. 14.

If the data type of the transmission target data is not the encryption target (No at Step S124), the communication control unit 64C transmits the transmission target data by using the un-encryption communication (Step S126). Then, the processing operation illustrated in FIG. 14 has been completed. Furthermore, for the data communication, for example, an un-encryption protocol, such as a UDP, is used. Then, if the communication adapter 3A1 receives the data on the basis of the un-encryption communication from the communication adapter 3A1, the communication adapter 3A1 receives unencrypted data. Consequently, the air conditioning control apparatus 6A1 does not encrypt the transmission target data with the communication adapter 3A1, so that the communication data volume is decreased, the communication traffic and the communication load are reduced, and an occurrence of congestion is suppressed.

In other words, the data type associated with the un-encryption target is specified on the basis of the count number n of the communication adapter 3A1 by using the switching table 68A. In the case where the count number n of the communication adapters 3A1 is 80<n≤128, by unencrypting the data having low confidentiality associated with, for example, the device model name, the device model type, and the failure detection information, the communication data volume is decreased, the communication traffic and the communication load are reduced, and an occurrence of congestion is suppressed.

In addition, in the case where the count number n of the communication adapters 3A1 is 100≤n≤128, in addition to unencrypting the data having low confidentiality, the data having medium confidentiality associated with, for example, the operation mode and the set temperature is unencrypted, an amount of data of the encryption communication is further decreased, the communication traffic and the communication load are further reduced, and an occurrence of congestion is suppressed.

Furthermore, for example, in the case where the count number n of the communication adapters 3A1 is 110<n≤128, in addition to the data having low confidentiality and the data having medium confidentiality, the data having high confidentiality associated with, for example, the air conditioning ON/OFF and the set of the wind direction and the air volume is also unencrypted. As a result, all of the pieces of communication corresponds to the un-encryption communication, both of the communication traffic and the communication load are reduced to a maximum extent, and an occurrence of congestion is suppressed.

Furthermore, in the case where the count number n of the communication adapters 3A1 is n<80, all of the pieces of data are encrypted. The value of the count number n of the communication adapters 3A1 is small, so that congestion does not occur.

In addition, the detection unit 34A included in the CPU 34 in the communication adapter 3A1 determines whether or not the data corresponding to the transmission target has been detected (Step S121). If the data corresponding to the transmission target has been detected (Yes at Step S121), the determination unit 341B included in the CPU 34 acquires the current connection count acquired from the air conditioning control apparatus 6A1 (Step S122).

The determination unit 341B refers to the switching table 38A, and specifies the data type associated with the un-encryption target on the basis of the count number n of the communication adapters 3A1 (Step S123). Furthermore, the data type is, for example, an encryption target or an un-encryption target. The determination unit 341B determines whether or not the data type of the transmission target data is the encryption target (Step S124).

If the data type of the transmission target data is the encryption target (Yes at Step S124), the communication control unit 34C controls the first communication unit 31 in order to transmit the transmission target data by using the encryption communication (Step S125), and ends the processing operation illustrated in FIG. 14. Furthermore, for the data communication, the data communication is performed by using TLS for HTTP corresponding to the encryption communication. Then, if the data is received from the communication adapter 3A1 on the basis of the encryption communication, the air conditioning control apparatus 6A1 decodes the encrypted data. Consequently, the communication adapter 3A1 communicates with the air conditioning control apparatus 6A1 by encrypting the transmission target data, so that it is possible to protect the information related to the individual user of the air conditioner 2 that is connected to the air conditioning control apparatus 6A1 and ensure privacy protection of the user. In addition, if the detection unit 34A does not detect the data corresponding to the transmission target (No at Step S121), the detection unit 34A ends the processing operation illustrated in FIG. 14.

If the data type of the transmission target data is not the encryption target (No at Step S124), the communication control unit 34C transmits the transmission target data by using the un-encryption communication (Step S126), and ends the processing operation illustrated in FIG. 14. Furthermore, for the data communication, the data communication is performed by using a UDP that is the un-encryption communication. Then, if the air conditioning control apparatus 6A1 receives the data on the basis of the un-encryption communication from the communication adapter 3A1, the air conditioning control apparatus 6A1 receives the unencrypted data. Consequently, the communication adapter 3A1 does not encrypt the transmission target data with the air conditioning control apparatus 6A1, so that it is possible to reduce the communication load needed for the transmission of the transmission target data.

Effects of the Third Embodiment

By sequentially unencrypting the pieces of communication data associated with the respective types in accordance with the value of the count number n of the communication adapters 3A1, it is possible to reduce the communication load placed on the air conditioning control apparatus 6A1 while maintaining the confidentiality of the data. In addition, it is possible to reduce the communication traffic in the network and suppress an occurrence of congestion.

By classifying the transmission target data into the encryption target and the un-encryption target in accordance with the connection count of the communication adapters 3A1 included in the air conditioning system 1 and by reducing an amount of data to be encrypted and the number of times a handshake performed every time the encryption communication is started, it is possible to reduce the load placed on the first communication unit 31 (the communication unit 61). Furthermore, by reducing the amount of data to be encrypted and the number of times a handshake performed at the time of encryption communication, it is possible to suppress the communication load placed on a wired LAN or a wireless LAN. Furthermore, by reducing the amount of data used for the encryption communication corresponding to the load placed on the first communication unit 31 (the communication unit 61), it is possible to configure the hardware, such as the first communication unit 31 (the communication unit 61), at a low price. In addition, even if the wired LAN or the wireless used for the open network is used for the communication, it is possible to maintain the privacy of the user who uses the air conditioner 2.

In addition, for convenience of description, a case has been described as an example in which the connection count monitoring unit 69A grasps the connection count of the communication adapters 3A1 included in the air conditioning system 1 on the basis of the number of times the IP address is assigned to the communication adapter 3A1 by the DHCP control unit 65D. However, the example is not limited to this and, for example, the air conditioning control apparatus 6A1 may transmit a command for requesting a replay of the device model name to each of the communication adapters 3A1 using multicast communication, and may grasp the connection count of the communication adapters 3A1 included in the air conditioning system 1 on the basis of the number of replies related to the device model name of each of the communication adapters 3A1, and appropriate modifications are possible.

In addition, a case has been described as an example in which, in the air conditioning system 1 according to the third embodiment, it is determined whether or not the data corresponding to the transmission target is communicated by using the encryption communication on the basis of the connection count of the air conditioners 2 included in the air conditioning system 1. However, the example is not limited to the connection count, but it may be possible to determine whether or not the data corresponding to the transmission target is communicated by using the encryption communication on the basis of the processing load placed on an air conditioning control apparatus 6B, and an embodiment thereof will be described as a fourth embodiment. Furthermore, by assigning the same reference numerals to components having the same configuration as those in the air conditioning system 1 according to the third embodiment, overlapped descriptions of the configuration and the operation thereof will be omitted.

Fourth Embodiment

<Configuration of Air Conditioning Control Apparatus>

Figure 15:
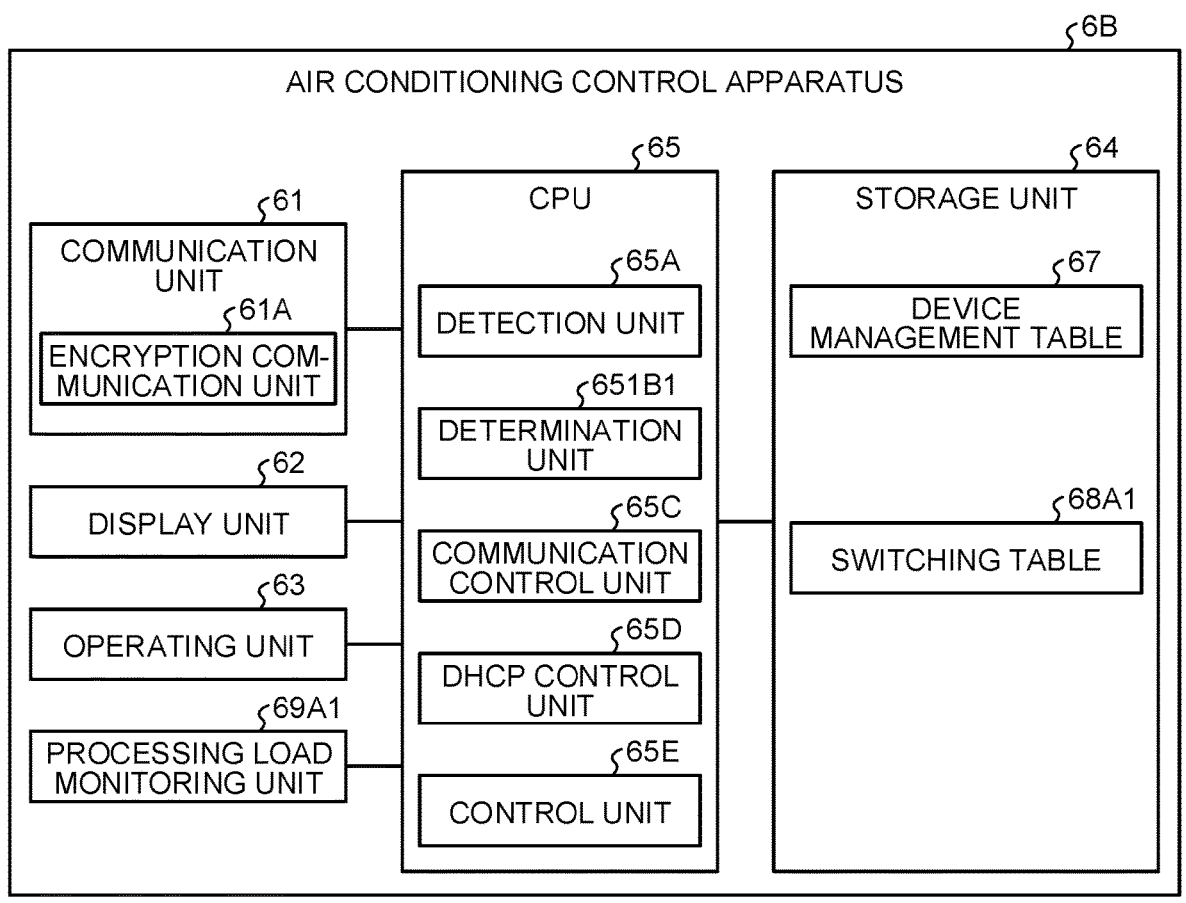
FIG. 15 is a block diagram illustrating one example of a configuration of an air conditioning control apparatus according to a fourth embodiment.

FIG. 15 is a block diagram illustrating one example of a configuration of the air conditioning control apparatus 6B according to the fourth embodiment. The air conditioning control apparatus 6B illustrated in FIG. 15 includes the communication unit 61, the display unit 62, the operating unit 63, the storage unit 64, and the CPU 65, and includes a processing load monitoring unit 69A1 instead of the connection count monitoring unit 69A. The processing load monitoring unit 69A1 monitors a processing load I placed on the communication unit 61 included in the air conditioning control apparatus 6B. The processing load monitoring unit 69A1 calculates the processing load I from the number of packets of the data that are sent and received by, for example, the communication unit 61 per unit time. The number of packets of the data that are sent and received per unit time and the processing load I are in proportion to each other. The storage unit 64 includes a switching table 68A1 instead of the switching table 68A.

Figures 16, 17:
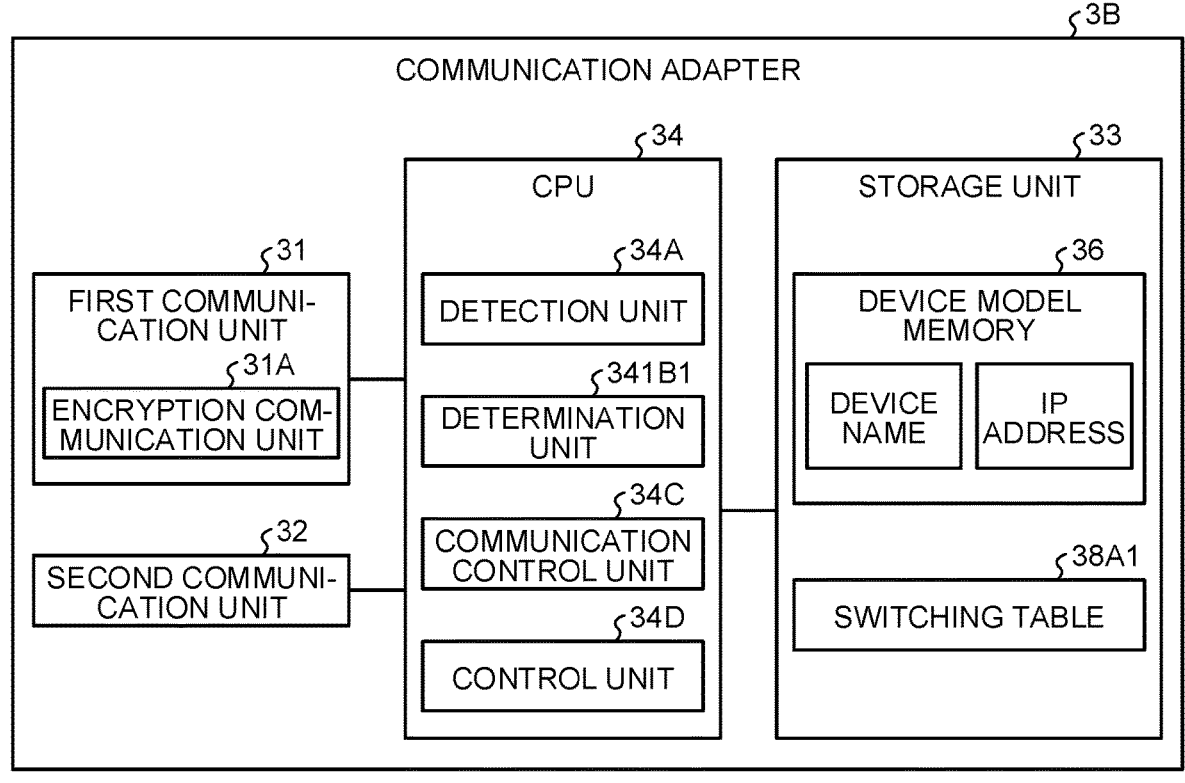
FIG. 16 is a diagram illustrating one example of a switching table.
FIG. 17 is a block diagram illustrating one example of a configuration of a communication adapter according to the fourth embodiment.

The switching table 68A1 is a table that stores therein the data type of the data corresponding to the transmission target to be switched from the encryption communication to the un-encryption communication in accordance with the processing load I according to the amount of processing load. FIG. 16 is a diagram illustrating one example of the switching table 68A1. Furthermore, for convenience of description, it is assumed that the processing load I varies in a range of, for example, 0 to 4. In the case where the amount of processing load I is 3≤I≤4 illustrated in FIG. 16, the data type that is associated with the un-encryption target and that is related to the data corresponding to the transmission target to be switched from the encryption communication to the un-encryption communication is associated with, for example, the air conditioning ON/OFF and the set of the wind direction and the air volume. In the case where the amount of processing load I is 2≤I≤4, the data type of the un-encryption target is associated with, for example, the operation mode and the set temperature. In the case where the amount of processing load I is 1≤I≤4, the data type of the un-encryption target is associated with, for example, the device model name, the device model type, and the failure detection information. Generally speaking, in the case where the amount of processing load I is larger than a predetermined threshold (here, integers of 1 to 3), the encryption communication is switched to the un-encryption communication.

In addition, the data type is constituted such that confidentiality of data is divided into three levels (high, medium, and low) in accordance with the degree related to the personal information on the user, and the range of the processing load I is assigned in accordance with the divided levels. For example, the air conditioning ON/OFF and the set of the wind direction and the air volume are items that are directly associated with presence/absence information that is the information on the individual user, so that the confidentiality of these items are set to high. For example, the operation mode and the set temperature are items that reflect the preference of the user, but the values thereof are held even at the time of the air conditioning OFF, so that it is assumed that the relation with the information on the individual user is not so high, and thus, the confidentiality is set to medium. For example, the device model name, the device model type, and the failure detection information are items that indicate information irrelevant to the individual user, so that the confidentiality is set to low. On the basis of this way of thinking, the switching table 68A1 is generated such that the encryption communication is sequentially switched to the un-encryption communication in a sequential manner from the data type having low confidentiality to the data type having high confidentiality in accordance with an increase in the amount of processing load I.

Furthermore, the CPU 65 includes a determination unit 651B1 instead of the determination unit 651B. The determination unit 651B1 determines whether or not the data corresponding to the transmission target is communicated by using the encryption communication in accordance with an increase in the processing load I placed on the communication unit 61. Specifically, the determination unit 651B1 refers to the switching table 68A1, and determines whether or not the data corresponding to the transmission target is switched from the encryption communication to the un-encryption communication in accordance with the amount of the processing load I. Then, the determination unit 651B1 refers to the switching table 68A1, and specifies the data that is to be communicated by using the un-encryption communication in accordance with the current processing load I.

In the case where the processing load I is I<1, the determination unit 651B1 determines that the pieces of data corresponding to the transmission target associated with all of the data types as the encryption target. In the case where the amount of processing load I is 1≤I≤4, the determination unit 651B1 refers to the switching table 68A1, and determines that the data associated with the device model name, the device model type, and the failure detection information is the un-encryption communication. In the case where the processing load I is 2≤I≤4, the determination unit 651B1 determines that the data associated with the operation mode and the set temperature is the un-encryption communication. In the case where the processing load I is 3≤I≤4, the determination unit 651B1 determines that the data associated with the air conditioning ON/OFF and the set of the wind direction and the air volume is the un-encryption communication.

In addition, the communication unit 61 periodically transmits, to a communication adapter 3B associated with each of the air conditioners 2, an amount of processing load that is the monitoring result obtained by the processing load monitoring unit 69A1.

<Configuration of Communication Adapter>

FIG. 17 is a block diagram illustrating one example of a configuration of the communication adapter 3B according to the fourth embodiment. The communication adapter 3B illustrated in FIG. 17 includes the first communication unit 31, the second communication unit 32, the storage unit 33, and the CPU 34. The storage unit 33 includes a switching table 38A1 instead of the switching table 38A. The switching table 38A1 is a table that switches the data corresponding to the transmission target from the encryption communication to the un-encryption communication in accordance with the value of the processing load I and that manages the data type of, for example, the un-encryption target.

The CPU 34 acquires the processing load I from the air conditioning control apparatus 6B by way of the first communication unit 31. The CPU 34 includes a determination unit 341B1 instead of the determination unit 341B. In the case where the processing load I is I<1, the determination unit 341B1 encrypts the pieces of data corresponding to the transmission target associated with all of the data types. In the case where the processing load I is 1≤I≤4, the determination unit 341B1 refers to the switching table 38A1, and determines that the data associated with the device model name, the device model type, and the failure detection information is the un-encryption communication. In the case where the processing load I is 2≤I≤4, the determination unit 341B1 determines that the data associated with the operation mode and the set temperature is the un-encryption communication. In the case where the processing load I is 3≤I≤4, the determination unit 341B1 determines that the data associated with the air conditioning ON/OFF and the set of the wind direction and the air volume is the un-encryption communication.

<Operation of Air Conditioning System>

Figure 18:
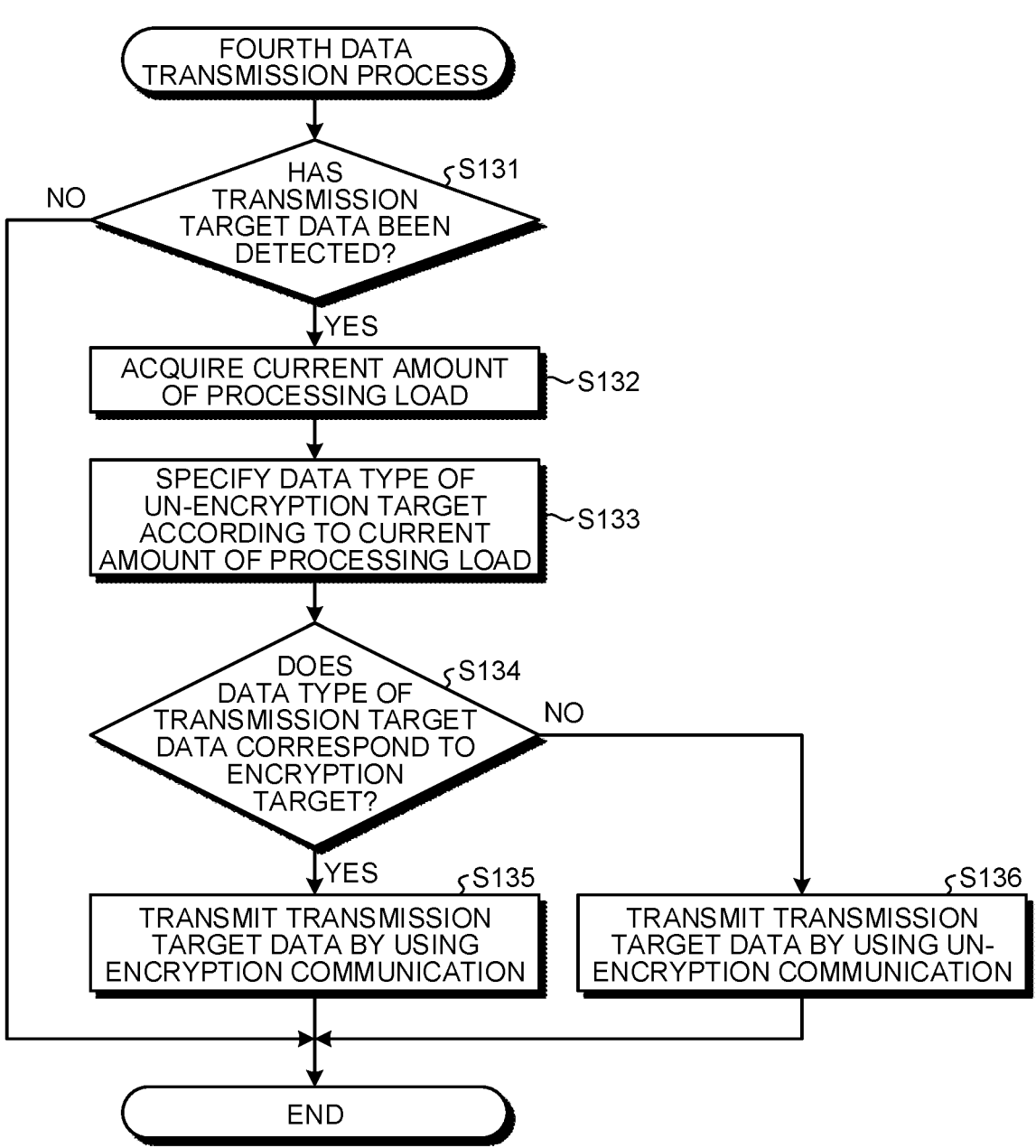
FIG. 18 is a flowchart illustrating one example of a processing operation related to a fourth data transmission process performed in the communication adapter or the air conditioning control apparatus.

In the following, an operation of the air conditioning system 1 according to the fourth embodiment will be described. FIG. 18 is a flowchart illustrating one example of a processing operation related to a fourth data transmission process performed in the air conditioning control apparatus 6B or the communication adapter 3B. Furthermore, for convenience of description, a case in which the fourth data transmission process is performed in the air conditioning control apparatus 6B will be described as an example; however, the fourth data transmission process may be performed in the communication adapter 3B instead of the air conditioning control apparatus 6B, and appropriate modifications are possible.

The detection unit 65A included in the CPU 65 in the air conditioning control apparatus 6B illustrated in FIG. 18 determines whether or not data corresponding to a transmission target has been detected (Step S131). Furthermore, the detection unit 65A detects an occurrence of data corresponding to the transmission target. If the data corresponding to the transmission target has been detected (Yes at Step S131), the determination unit 651B1 included in the CPU 65 acquires the current amount of processing load placed on the communication unit 61 from the processing load monitoring unit 69A1 (Step S132).

The determination unit 651B1 refers to the switching table 68A1, and specifies the data type that is associated with the un-encryption target and that is in accordance with the current amount of processing load (Step S133). Furthermore, the data type is the type of data corresponding to, for example, an encryption target or an un-encryption target. The determination unit 651B1 determines whether or not the data type of the transmission target data is an encryption target (Step S134).

If the data type of the transmission target data is an encryption target (Yes at Step S134), the communication control unit 64C controls the communication unit 61 in order to transmit the transmission target data by using the encryption communication (Step S135), and ends the processing operation illustrated in FIG. 18. Furthermore, for the data communication, for example, an encryption protocol, such as TLS for HTTP, is used. Then, if the communication adapter 3B receives the data on the basis of the encryption communication from the air conditioning control apparatus 6B, the communication adapter 3B decodes the encrypted data. Consequently, the air conditioning control apparatus 6B performs communication with the communication adapter 3B by encrypting the transmission target data, so that it is possible to protect the information related to the individual user of the air conditioner 2 that is connected to the air conditioning control apparatus 6B and ensure privacy protection of the user. In addition, if the detection unit 65A does not detect the data corresponding to the transmission target (No at Step S131), the detection unit 65A ends the processing operation illustrated in FIG. 18.

If the data type of the transmission target data is not the encryption target (No at Step S134), the communication control unit 64C transmits the transmission target data by using the un-encryption communication (Step S136). Then, the processing operation illustrated in FIG. 18 has been completed. Furthermore, for the data communication, for example, an un-encryption protocol, such as a UDP, is used. Then, if the communication adapter 3B receives the data on the basis of the un-encryption communication from the communication adapter 3B, the communication adapter 3B receives the unencrypted data. Consequently, the air conditioning control apparatus 6B does not encrypt the transmission target data with the communication adapter 3B, so that the communication data volume is decreased, the communication traffic and the communication load are reduced, and an occurrence of congestion is suppressed.

In other words, the data type associated with the un-encryption target is specified on the basis of the amount of processing load I by using the switching table 68A1. In the case where the amount of processing load I is $1 \leq I \leq 4$, by unencrypting the data having low confidentiality associated with, for example, the device model name, the device model type, and the failure detection information, the communication data volume is decreased, the communication traffic and the communication load are reduced, and an occurrence of congestion is suppressed.

In addition, in the case where the amount of processing load I is $2 \leq I \leq 4$, in addition to unencrypting the data having low confidentiality, the data having medium confidentiality associated with, for example, the operation mode and the set temperature is unencrypted, an amount of data of the encryption communication is further decreased, the communication traffic and the communication load are further reduced, and an occurrence of congestion is suppressed.

Furthermore, for example, in the case where the amount of processing load I is $3 \leq I \leq 4$, the data having high confidentiality associated with, for example, the air conditioning ON/OFF and the set of the wind direction and the air volume is also unencrypted. As a result, all of the pieces of communication corresponds to the un-encryption communication, both of the communication traffic and the communication load are reduced to a maximum extent, and an occurrence of congestion is suppressed.

Furthermore, in the case where the amount of processing load I is $I<1$, all of the pieces of data are encrypted. The value of the amount of processing load I is small, so that congestion does not occur.

In addition, the detection unit 34A included in the CPU 34 in the communication adapter 3B determines whether or not the data corresponding to the transmission target has been detected (Step S131). If the data corresponding to the transmission target has been detected (Yes at Step S131), the determination unit 341B1 included in the CPU 34 acquires the current amount of processing load acquired from the air conditioning control apparatus 6B (Step S132).

The determination unit 341B1 refers to the switching table 38A1, and specifies the data type that is associated with the un-encryption target and that is in accordance with the current amount of processing load I (Step S133). Furthermore, the data type is the type of data corresponding to, for example, an encryption target or an un-encryption target. The determination unit 341B1 determines whether or not the data type of the transmission target data is the encryption target (Step S134).

If the data type of the transmission target data is the encryption target (Yes at Step S134), the communication control unit 34C controls the first communication unit 31 in order to transmit the transmission target data by using the encryption communication (Step S135), and ends the processing operation illustrated in FIG. 18. Furthermore, for the data communication, for example, an encryption protocol, such as TLS for HTTP, is used. Then, if the air conditioning control apparatus 6B receives the data on the basis of the encryption communication from the communication adapter 3B, the air conditioning control apparatus 6B decodes the encrypted data. Consequently, the communication adapter 3B communicates with the air conditioning control apparatus 6B by encrypting the transmission target data, so that it is possible to protect the information related to the individual user of the air conditioner 2 that is connected to the air conditioning control apparatus 6B and ensure privacy protection of the user. In addition, if the detection unit 34A does not detect the data corresponding to the transmission target (No at Step S131), the detection unit 34A ends the processing operation illustrated in FIG. 18.

If the data type of the transmission target data is not the encryption target (No at Step S134), the communication control unit 34C transmits the transmission target data by using the un-encryption communication (Step S136), and ends the processing operation illustrated in FIG. 18. Furthermore, for the data communication, for example, an un-encryption protocol, such as a UDP, is used. Then, if the air conditioning control apparatus 6B receives the data on the basis of the un-encryption communication from the communication adapter 3B, the air conditioning control apparatus 6B receives the unencrypted data. Consequently, the communication adapter 3B does not encrypt the transmission target data with the air conditioning control apparatus 6B, it is possible to reduce the communication load needed for the transmission of the transmission target data.
<Effects of the Fourth Embodiment>

By sequentially unencrypting the communication data for each of the associated types in accordance with the value of the amount of processing load I, it is possible to reduce the communication load placed on the air conditioning control apparatus 6A1 while maintaining the confidentiality of the data. In addition, it is possible to reduce the communication traffic in the network and suppress an occurrence of congestion.

By classifying the transmission target data into the encryption target and the un-encryption target in accordance with the amount of processing load placed on the air conditioning system 1 and by reducing an amount of data to be encrypted and the number of times a handshake performed every time the encryption communication is started, it is possible to reduce the load placed on the first communication unit 31 (the communication unit 61). Furthermore, by reducing the amount of data to be encrypted and the number of times a handshake performed at the time of encryption communication, it is possible to suppress the communication load placed on a wired LAN or a wireless LAN. Furthermore, by reducing the amount of data used for the encryption communication corresponding to the load placed on the first communication unit 31 (the communication unit 61), it is possible to configure the hardware, such as the first communication unit 31 (the communication unit 61), at a low price. Even if the wired LAN or the wireless used for the open network is used for the communication, it is possible to maintain the privacy of the user who uses the air conditioner 2.

In addition, for convenience of description, a case has been described as an example in which the processing load monitoring unit 69A1 calculates the amount of processing load from the number of packets of the data that is sent and received by, for example, the communication unit 61 per unit time. However, the example is not limited to this. The processing load monitoring unit 69A1 may grasp the amount of the processing load by inquiring of the OS about the load placed on the CPU usage rate from the program running on the OS of, for example, the air conditioning control apparatus 6B, and appropriate modifications are possible.

In addition, in the air conditioning system 1 according to the first embodiment, in the case where the data type of the transmission target data is the encryption target, the transmission target data is transmitted by using the encryption communication, whereas, in the case where data type of the transmission target data is the un-encryption target, the transmission target data is transmitted by using the un-encryption communication. However, it may be possible to determine whether or not the data corresponding to the transmission target is communicated by using the encryption communication, instead of the data type of the transmission target data, on the basis of the indoor unit type of the air conditioner 2, and an embodiment thereof will be described as a fifth embodiment. Furthermore, by assigning the same reference numerals to components having the same configuration as those in the air conditioning system 1 according to the first embodiment, overlapped descriptions of the configuration and the operation thereof will be omitted.

Fifth Embodiment

Figure 19:
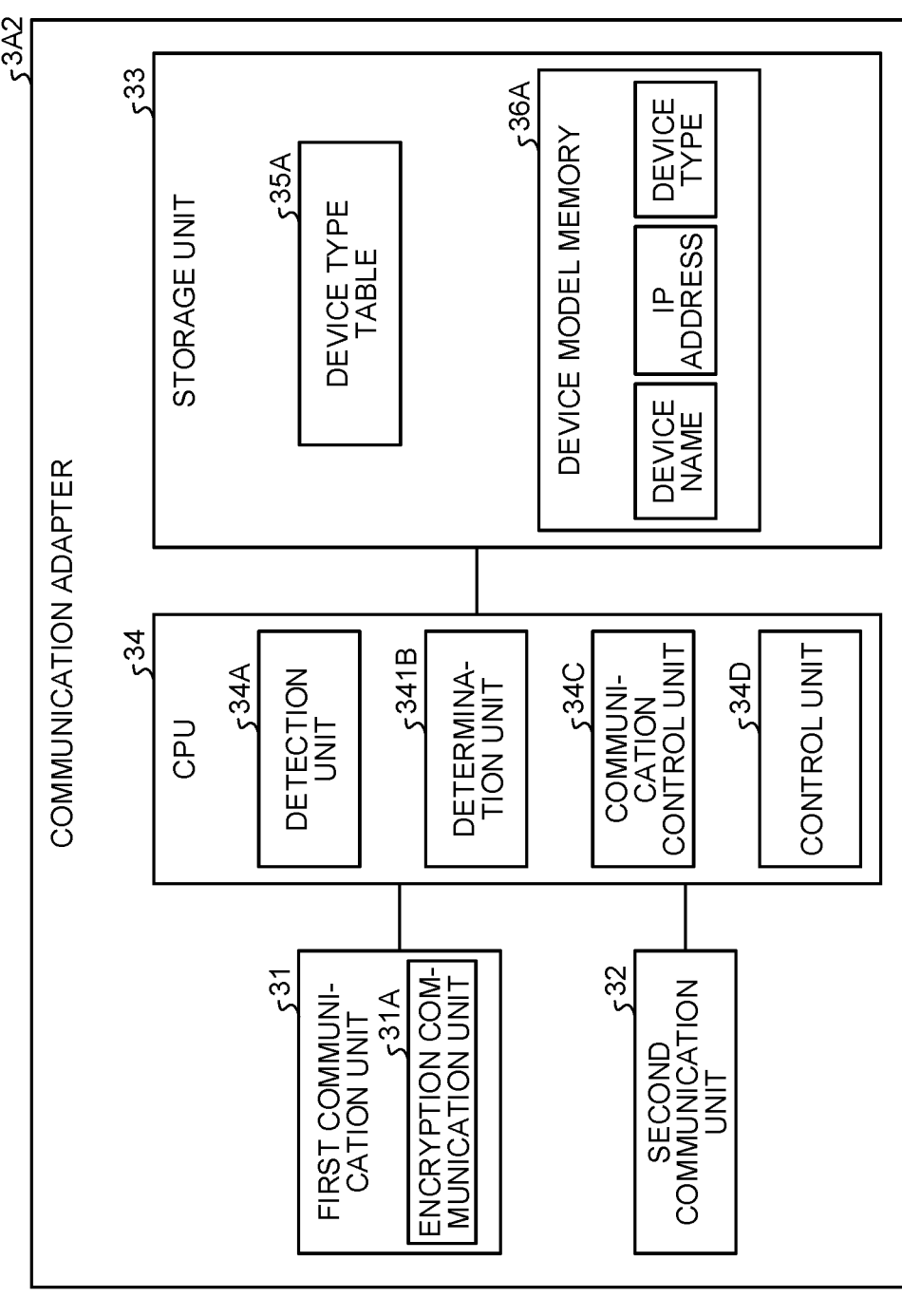
FIG. 19 is a block diagram illustrating one example of a configuration of a communication adapter according to a fifth embodiment.

FIG. 19 is a block diagram illustrating one example of a configuration of a communication adapter 3A2 according to the fifth embodiment. The communication adapter 3A2 illustrated in FIG. 19 includes the first communication unit 31, the second communication unit 32, the storage unit 33, and the CPU 34. The storage unit 33 includes a device type table 35A instead of the data type table 35, and includes a device model memory 36A instead of the device model memory 36. Furthermore, the CPU 34 includes the determination unit 341B instead of the determination unit 34B.

The device type table 35A is a table that is used to determine, at the time of communication of various kinds of data, whether or not the pieces of data are to be encrypted. FIG. 20 is a diagram of a data column 37 illustrating one example of the data stored in the device type table 35A. The data column 37 illustrated in FIG. 20 is a set of the data that manages the indoor unit type of the air conditioner 2 for each device type. The device type is information for identifying a device corresponding to an encryption target or a device corresponding to an un-encryption target. The encryption target device is a device that transmits the transmission target data by using the encryption communication. The un-encryption target device is a device that transmits the transmission target data by using the un-encryption communication. The indoor unit type is information for identifying the type of the indoor unit indicating, for example, a wall mounted type indoor unit of the wall mounted type air conditioner 2A, a duct type indoor unit of the duct type air conditioner 2B, a ceiling type indoor unit of the ceiling type air conditioner 2C, and the like.

Regarding the wall mounted type air conditioner 2A, the wall mounted type indoor unit is installed in each of the rooms, so that it is possible to specify the information related to the individual user, such as the presence or the preference of the user in the room, on the basis of an operation performed on the wall mounted type indoor unit, and thus, the transmission target data needs to be treated as the data having high confidentiality. Accordingly, the wall mounted type air conditioner 2A is regarded as an encryption target device that transmits the transmission target data by using the encryption communication.

The duct type air conditioner 2B is the air conditioner 2 that adjusts air in a plurality of rooms by way of a duct, and thus, it is not possible to specify the information related to the individual user from the operating information on the duct type air conditioner 2B, so that the transmission target data is treated as the data having low confidentiality. Accordingly, the duct type air conditioner 2B is regarded as an un-encryption target device that transmits the transmission target data by using the un-encryption communication. In addition, also, the ceiling type air conditioner 2C is an air conditioner that is often installed in a large room that is used by a large number of unspecified user, and thus, it is regarded that it is not possible to specify the information related to the individual user from the operating information on the ceiling type air conditioner 2C, and the transmission target data is treated as the data having low confidentiality. The ceiling type air conditioner 2C is also regarded as an un-encryption target device that transmits the transmission target data by using the un-encryption communication. However, this is one embodiment, and in the case where, for example, the ceiling type air conditioner 2C is installed in a private room in which a user stays, it may be possible to regard the ceiling type air conditioner 2C as an encryption target device.

On the basis of this way of thinking, the device type table 35A is allowed to store therein, as the data column 37, the wall mounted type air conditioner 2A as the encryption target device, the ceiling type air conditioner 2C and the duct type air conditioner 2B as the un-encryption target.

The device model memory 36A stores therein, the IP address of the communication adapter 3A2, the device name of the air conditioner 2 to which the communication adapter 3A2 is connected, and the device type of the air conditioner 2 to which the communication adapter 3A2 is connected. The device name is, for example, the wall mounted type air conditioner 2A, the duct type air conditioner 2B, the ceiling type air conditioner 2C, or the like. The IP address is the IP address that is assigned to the communication adapter 3. The device type is, for example, an encryption target device or an un-encryption target device.

The determination unit 341B refers to the device type table 35A on the basis of the indoor unit type of the air conditioner 2 to which the communication adapter 3A2 is connected, and determines whether or not the encryption communication is used with respect to the data corresponding to the transmission target. If the indoor unit type of the air conditioner 2 related to the data corresponding to the transmission target is the encryption target device, the determination unit 341B determines that the encryption communication is used with respect to the data corresponding to the transmission target. In the case where the indoor unit type of the air conditioner 2 related to the data corresponding to the transmission target is the un-encryption target device, the determination unit 341B determines that the encryption communication is not used with respect to the data corresponding to the transmission target.

In the case where the indoor unit type of the air conditioner 2 is a wall mounted type, the determination unit 341B determines that the encryption communication is used with respect to the data corresponding to the transmission target. Furthermore, in the case where the indoor unit type of the air conditioner 2 is a ceiling type or a duct type, the determination unit 341B determines that the encryption communication is not used, that is, the un-encryption communication is used, with respect to the data corresponding to the transmission target.

<Configuration of Air Conditioning Control Apparatus>

Figure 21:
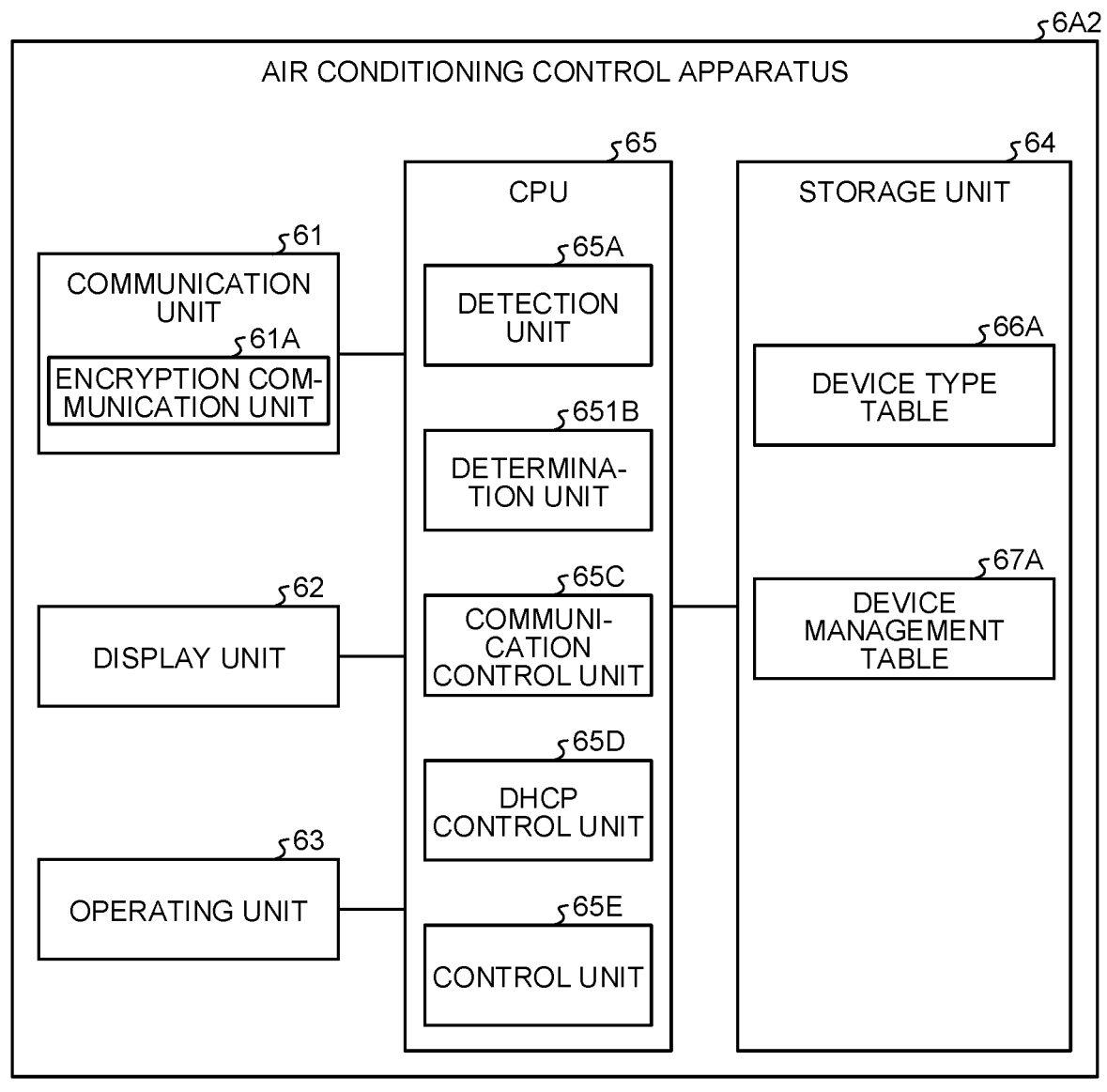
FIG. 21 is a block diagram illustrating one example of a configuration of an air conditioning control apparatus according to the fifth embodiment.

FIG. 21 is a block diagram illustrating one example of a configuration of an air conditioning control apparatus 6A2 according to the fifth embodiment. The air conditioning control apparatus 6A2 illustrated in FIG. 21 includes the communication unit 61, the display unit 62, the operating unit 63, the storage unit 64, and the CPU 65. The storage unit 64 includes a device type table 66A and a device management table 67A. The device type table 66A is a table that manages an indoor unit type for each of the device types. The device type table 66A has the same content as that of the device type table 35A included in the communication adapter 3A2. The device type table 66A manages the encryption target device and the un-encryption target device for each of the indoor unit types of the air conditioner 2. The device management table 67A is a table that manages the device name, the IP address, and the device type of the air conditioner 2 that is connected to each of the communication adapters 3A2. The indoor unit type of the air conditioner 2 is, for example, the wall mounted type air conditioner 2A, the duct type air conditioner 2B, the ceiling type air conditioner 2C, or the like. The IP address is the IP address that to the communication adapter 3 that is connected to the air conditioner 2. The device type is an encryption target device or an un-encryption target device.

The determination unit 651B refers to the device type table 66A on the basis of the indoor unit type of the air conditioner 2 to which the communication adapter 3A2 associated with the transmission target is connected, and determines whether or not the encryption communication is used with respect to the data corresponding to the transmission target. In the case where the indoor unit type of the air conditioner 2 to which the communication adapter 3A2 associated with the transmission target is connected is the encryption target device, the determination unit 651B determines that the encryption communication is used with respect to the data corresponding to the transmission target. In the case where the indoor unit type of the air conditioner 2 to which the communication adapter 3A2 associated with the transmission target is connected is the un-encryption target device, the determination unit 651B determines that the encryption communication is not used, that is, the un-encryption communication is used, with respect to the data corresponding to the transmission target.

In the case where the indoor unit type of the air conditioner 2 to which the communication adapter 3A2 associated with the transmission target is connected is the wall mounted type air conditioner 2A, the determination unit 651B determines that the encryption communication is used with respect to the data corresponding to the transmission target. Furthermore, in the case where the air conditioner 2 to which the communication adapter 3A2 associated with the transmission target is connected is the ceiling type air conditioner 2C or the duct type air conditioner 2B, the determination unit 651B determines that the encryption communication is not used, that is, the un-encryption communication is used, with respect to the data corresponding to the transmission target.

<Operation of Air Conditioning System>

Figure 22:
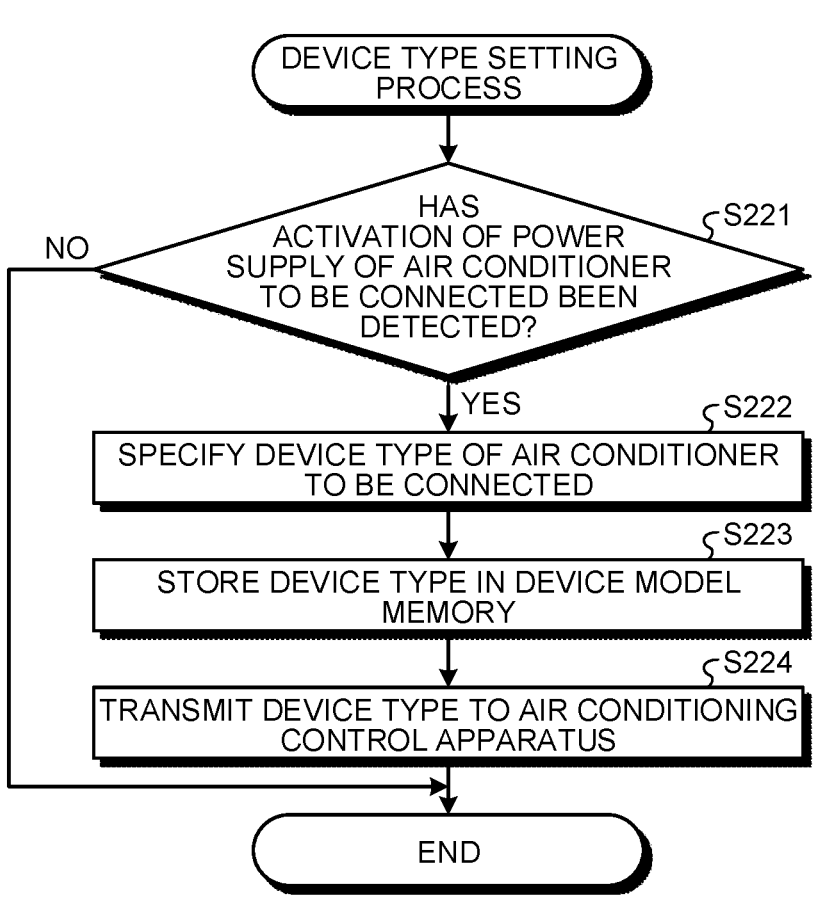
FIG. 22 is a flowchart illustrating one example of a processing operation related to a device type setting process performed in the communication adapter.

In the following, an operation of the air conditioning system 1 according to the fifth embodiment will be described. FIG. 22 is a flowchart illustrating one example of a processing operation related to a device type setting process performed in the communication adapter 3A2. The communication adapter 3A2 determines whether or not power supply activation of the connected air conditioner 2 has been detected (Step S221). If the power supply activation of the connected air conditioner 2 has been detected (Yes at Step S221), the communication adapter 3A2 refers to the device type table 35A, and specifies the device type that is associated with the indoor unit type of the connected air conditioner 2 (Step S222). Furthermore, the communication adapter 3A2 stores therein the specified device type in the device model memory 36A (Step S223). For example, if the air conditioner 2 connected to the communication adapter 3A2 is the ceiling type air conditioner 2C, the ceiling type air conditioner 2C is stored as the device name, the IP address of the air conditioner 2 is stored as the IP address, and the un-encryption target device is stored as the device type in the device model memory 36A.

After the communication adapter 3A2 has stored the device type in the device model memory 36A, the communication adapter 3A2 transmits the device type to the air conditioning control apparatus 6A2 (Step S224), and ends the processing operation illustrated in FIG. 22. Then, the air conditioning control apparatus 6A2 stores the device type of the air conditioner 2 received from the communication adapter 3A2 in the device management table 67A. Consequently, the air conditioning control apparatus 6A2 is able to grasp the device type of each of the air conditioners 2 included in the air conditioning system 1.

If the communication adapter 3A2 does not detect the power supply activation of the air conditioner 2 (No at Step S221), the communication adapter 3A2 ends the processing operation illustrated in FIG. 22.

Figure 23:
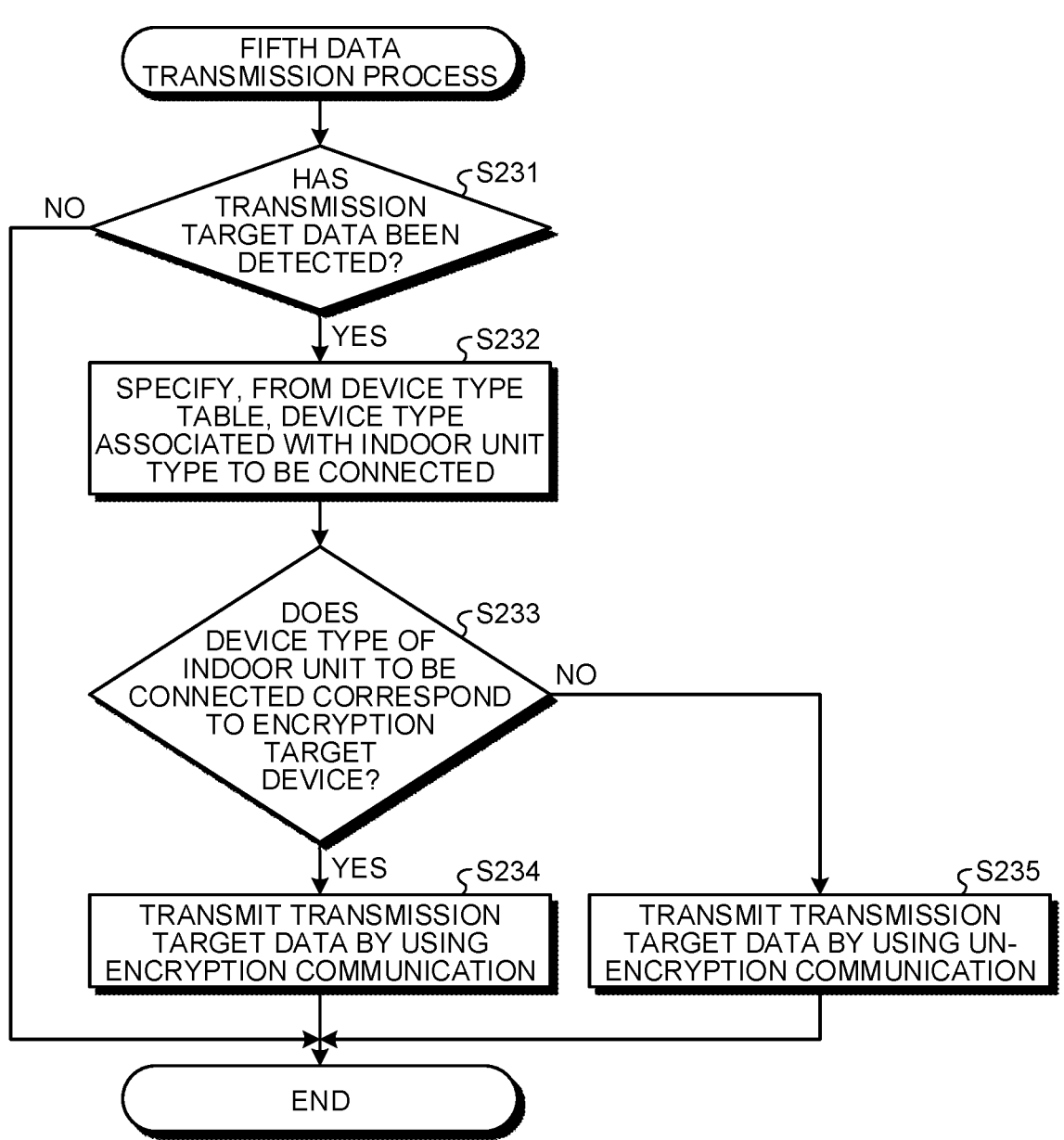
FIG. 23 is a flowchart illustrating one example of a processing operation related to a fifth data transmission process performed in the communication adapter or the air conditioning control apparatus.

FIG. 23 is a flowchart illustrating one example of the processing operation related to a fifth data transmission process performed in the communication adapter 3A2 or the air conditioning control apparatus 6A2. Furthermore, for convenience of description, a case in which the fifth data transmission process is performed in the communication adapter 3A2 will be described as an example; however, the fifth data transmission process may be performed in the air conditioning control apparatus 6A2 instead of the communication adapter 3A2, and appropriate modifications are possible.

The detection unit 34A included in the CPU 34 in the communication adapter 3A2 illustrated in FIG. 23 determines whether or not the data corresponding to the transmission target has been detected (Step S231). Furthermore, the detection unit 34A detects an occurrence of data corresponding to the transmission target. If the data corresponding to the transmission target has been detected (Yes at Step S231), the determination unit 341B included in the CPU 34 refers to the device type table 35A, and specifies the device type that is associated with the indoor unit type of the air conditioner 2 that transmits the transmission target data (Step S232). Furthermore, the device type is, for example, an encryption target device or an un-encryption target device.

The determination unit 341B determines whether or not the device type of the air conditioner 2 that transmits the transmission target data is the encryption target device (Step S233). If the device type of the air conditioner 2 is the encryption target device (Yes at Step S233), the communication control unit 34C controls the first communication unit 31 in order to transmission the target data by using the encryption communication (Step S234), and ends the processing operation illustrated in FIG. 23. Furthermore, for the data communication, for example, an encryption protocol, such as TLS for HTTP is used. Then, if the air conditioning control apparatus 6A2 receives the data on the basis of the encryption communication from the communication adapter 3A2, the air conditioning control apparatus 6A2 decodes the encrypted data. Consequently, the communication adapter 3A2 performs communication with the air conditioning control apparatus 6A2 by encrypting the transmission target data, so that it is possible to protect the information related to the individual user of the air conditioner 2 that is connected to the communication adapter 3A2 and ensure privacy protection of the user. In addition, if the detection unit 34A does not detect the data corresponding to the transmission target (No at Step S231), the detection unit 34A ends the processing operation illustrated in FIG. 23.

If the device type of the air conditioner 2 that transmits the transmission target data is not the encryption target device (No at Step S233), the communication control unit 34C determines that the device type of the air conditioner 2 is the un-encryption target device, and transmits the transmission target data by using the un-encryption communication (Step S235). Then, the processing operation illustrated in FIG. 23 has been completed. Furthermore, for the data communication, for example, an un-encryption protocol, such as a UDP, is used. Then, if the air conditioning control apparatus 6 receives the data on the basis of the un-encryption communication from the communication adapter 3A2, the air conditioning control apparatus 6 receives the unencrypted data. Consequently, the communication adapter 3A2 does not encrypt the transmission target data with the air conditioning control apparatus 6A2, so that it is possible to reduce the communication load needed for the transmission of the transmission target data.

In addition, the detection unit 65A included in the CPU 65 in the air conditioning control apparatus 6A2 determines whether or not to detect the data corresponding to the transmission target (Step S231). If the detection unit 65A has detected the data corresponding to the transmission target (Yes at Step S231), the determination unit 651B included in the CPU 65 refers to the device type table 66A, and specifies the device type that is associated with the indoor unit type of the air conditioner 2 corresponding to the destination of the transmission target data (Step S232). Furthermore, the device type is, for example, an encryption target device or an un-encryption target device.

The determination unit 651B determines whether or not the device type of the air conditioner 2 that corresponding to the destination of the transmission target data is the encryption target device (Step S233). If the device type of the air conditioner 2 that corresponding to the destination of the transmission target data is the encryption target device (Yes at Step S233), the communication control unit 65C controls the communication unit 61 in order to transmit the transmission target data by using the encryption communication (Step S234), and ends the processing operation illustrated in FIG. 23. Furthermore, for the data communication, the data communication is performed by using TLS for HTTP corresponding to the encryption communication. Then, if the communication adapter 3A2 receives the data on the basis of the encryption communication from the air conditioning control apparatus 6A2, the communication adapter 3A2 decodes the encrypted data. Consequently, the air conditioning control apparatus 6A2 performs communication with the communication adapter 3A2 by encrypting the transmission target data, so that it is possible to protect the information related to the individual user of the air conditioner 2 that is connected to the communication adapter 3A2 and ensure privacy protection of the user. In addition, if the detection unit 65A does not detect the data corresponding to the transmission target (No at Step S231), the detection unit 65A ends the processing operation illustrated in FIG. 23.

If the device type of the air conditioner 2 that corresponds to the destination of the transmission target data is not the encryption target device (No at Step S233), the communication control unit 65C determines that the air conditioner 2 is the un-encryption target device, transmits the transmission target data by using the un-encryption communication (Step S235), and ends the processing operation illustrated in FIG. 23. Furthermore, for the data communication, the data communication is performed by using a UDP that is the un-encryption communication. Then, if the communication adapter 3A2 receives the data on the basis of the un-encryption communication from the air conditioning control apparatus 6A2, the communication adapter 3A2 receives the unencrypted data. Consequently, the air conditioning control apparatus 6A2 does not encrypt the transmission target data with the communication adapter 3A2, so that it is possible to reduce the communication load needed for the transmission of the transmission target data.

Effects of the Fifth Embodiment

The data communication performed by each of the ceiling type air conditioner 2C and the duct type air conditioner 2B is associated with information that is irrelevant to the individual user, so that the un-encryption communication is used. Therefore, it is possible to reduce the communication load placed on the communication adapter 3A2 side and the communication traffic occurring in the wireless LAN needed for the data communication performed by each of the ceiling type air conditioner 2C and the duct type air conditioner 2B. In other words, in the case where the encryption communication is used, there is a need to perform the communication procedure for the encryption communication including, for example, a handshake, a key exchange, and the like, and thus, the communication traffic is increased. In contrast, In the case where the un-encryption communication is used, there is no need to perform the communication procedure for the encryption communication including, for example, a handshake, a key exchange, and the like, and it is thus possible to reduce the communication traffic in the wired LAN or the wireless LAN. Furthermore, it is possible to reduce the communication traffic, which leads to a decrease in load placed on the communication process performed by the communication adapter 3A2.

In addition, the data communication performed by the wall mounted type air conditioner 2A corresponds to information related to the individual user, such as the presence of the user in the room in which the wall mounted type air conditioner 2A has been installed and the preference or the user related a room environment, so that communication is performed by using the encryption communication. Consequently, it is possible to protect the privacy of the user.

By classifying the devices into the encryption target device and the un-encryption target device in accordance with the indoor unit type of the air conditioner 2 and by reducing an amount of data to be encrypted and the number of times a handshake performed every time the encryption communication is started, it is possible to reduce the load placed on the first communication unit 31 (the communication unit 61). Furthermore, by reducing the amount of data to be encrypted and the number of times a handshake performed at the time of encryption communication, it is possible to suppress the communication load placed on a wired LAN or a wireless LAN. Furthermore, by reducing the amount of data used for the encryption communication corresponding to the load placed on the first communication unit 31 (the communication unit 61), it is possible to configure the hardware, such as the first communication unit 31 (the communication unit 61), at a low price. In addition, even if the wired LAN or the wireless used for the open network is used for the communication, it is possible to maintain the privacy of the user who uses the air conditioner 2.

In addition, for convenience of description, a case has been described as an example in which the ceiling type air conditioner 2C is treated as the un-encryption target device; however, as described above, in the case where the ceiling type air conditioner 2C is installed in a private room, the data communication corresponds to information related to the individual user, such as the presence, the preference, and the like of the user in the private room, so that the ceiling type air conditioner 2C may be regarded as the encryption target device. In addition, as the type of the air conditioner 2, the wall mounted type, the ceiling type, and the duct type are used as the examples; however, there is also a ceiling hanging type, and a ceiling hanging type air conditioner is also used in a large venue by a large number of unspecified user. Therefore, the communication data thereof has low confidentiality, and thus, the ceiling hanging type air conditioner may be regarded as the un-encryption target device, and appropriate modifications are possible.

In addition, for convenience of description, a case has been described as an example in which the hub 5 is arranged between the air conditioning control apparatus 6 (6A, 6A1, 6A2, and 6B) and the access point 4; however, the hub 5 may be arranged between the air conditioning control apparatus 6 (6A, 6A1, 6A2, and 6B) and the access point 4. In addition, a case has been described as an example in which the air conditioning control apparatus 6 (6A, 6A1, 6A2, 6B) and the access point 4 are connected in a wired manner; however, a wireless connection may be used. In addition, a case has been described as an example in which the communication adapter 3 (3A, 3A1, 3A2, and 3B) and the access point 4 are connected by the wireless LAN; however, for example, a wired communication network, such as a wired LAN, may be used, and appropriate modifications are possible.

REFERENCE SIGNS LIST 1 air conditioning system
2 air conditioner
3, 3A communication adapter
6, 6A air conditioning control apparatus
21 indoor unit
31 first communication unit
34B determination unit
34C communication control unit
61 communication unit
65B determination unit
65C communication control unit
341B determination unit
651B determination unit

The invention claimed is:

1. An air conditioner comprising:
a memory; and processing circuitry coupled to the memory and configured to:
communicate data to an air conditioning control apparatus that performs centralized control of a plurality of air conditioners;
refer to a table in the memory that stores whether transmission target data associated with each of data types is an encryption target data or not;
determine that the transmission target data is communicated by using encryption communication when the transmission target data is the encryption target data and that the transmission target data is communicated by using un-encryption communication when the transmission target data is not the encryption target data;
control, when the transmission target data is communicated by using the encryption communication, the communicating in order to communicate the transmission target data by using the encryption communication; and
control, when the transmission target data is communicated by using the un-encryption communication, the communicating in order to communicate the transmission target data by using the un-encryption communication.

2. The air conditioner according to claim 1, wherein the processing circuitry is further configured to monitor a congestion state of data communication per-
formed by the communicating; and determine, based on a congestion index that indicates the
congestion state, whether or not the transmission target
data is communicated by using the encryption communication.

3. The air conditioner according to claim 2, wherein,
when the congestion index exceeds a predetermined value,
the processing circuitry is further configured to determine
that the transmission target data is switched from the encryption communication to un-encryption communication.

4. The air conditioner according to claim 3, wherein the
memory includes a switching table that manages a data type indicating, in
each of a plurality of ranges of the congestion index,
whether or not the encryption communication with
respect to the transmission target data is switched to the
un-encryption communication, and wherein the processing circuitry is further configured to refer to
the switching table and determine, based on the congestion index, whether or not the transmission target
data is switched from the encryption communication to
the un-encryption communication.

5. The air conditioner according to claim 4, wherein the
switching table is constituted such that the encryption communication is switched to the un-encryption communication
in accordance with an increase in a value of the congestion
index in ascending order of a degree related to personal
information on a user associated with the data type.

6. The air conditioner according to claim 2, wherein the
processing circuitry is further configured to calculate the
congestion index from a packet loss count with respect to a
predetermined amount of data transmission.

7. The air conditioner according to claim 1, wherein data
having a data type associated with an encryption target is
data that is related to setting and a state about an operation
of each of the air conditioners that is used by users and that
is related to the individual users.

8. The air conditioner according to claim 1, wherein the
processing circuitry is further configured to determine,
based on an indoor unit type of each of the air conditioners,
whether or not the transmission target data is communicated
by using the encryption communication.

9. The air conditioner according to claim 8, wherein, when the indoor unit type of the air conditioner is an
indoor unit having a wall mounted type, the processing
circuitry is further configured to determine that the
transmission target data is communicated by using the
encryption communication, and, when the indoor unit type of the air conditioner is an
indoor unit having a ceiling type or an indoor unit
having a duct type, determine that the transmission
target data is not communicated by using the encryp-
tion communication.

10. An air conditioning control apparatus that performs
centralized control of a plurality of air conditioners, the air
conditioning control apparatus comprising:

a memory; and processing circuitry coupled to the memory and config-
ured to: communicate data to the air conditioners;

refer to a table in the memory that stores whether trans-
mission target data associated with each of data types
is an encryption target data or not;

determine that the transmission target data is communicated by using encryption communication when the
transmission target data is the encryption target data and that the transmission target data is communicated
by using un-encryption communication when the trans-
mission target data is not the encryption target data;

control, when the transmission target data is communi-
cated by using the encryption communication, the
communicating in order to communicate the transmis-
sion target data by using the encryption communica-
tion; and control, when the transmission target data is communi-
cated by using the un-encryption communication, the
communicating in order to communicate the transmis-
sion target data by using the un-encryption communi-
cation.

11. The air conditioning control apparatus according to
claim 10, wherein the processing circuitry is further config-
ured to monitor a count number of the air conditioners; and determine, based on the count number, whether or not the
transmission target data is communicated by using the
encryption communication.

12. The air conditioning control apparatus according to
claim 11, wherein, when the count number is larger than a
predetermined threshold, the processing circuitry is further
configured to determine that the transmission target data is
switched from the encryption communication to un-encryp-
tion communication.

13. The air conditioning control apparatus according to
claim 11, wherein the memory includes a switching table that manages a data type indicating, in
each of a plurality of ranges of the count number,
whether or not the encryption communication with
respect to the transmission target data is switched to the
un-encryption communication, and wherein the processing circuitry is further configured to refer to
the switching table and determine, based on the count
number, whether or not the transmission target data is
switched from the encryption communication to the
un-encryption communication.

14. The air conditioning control apparatus according to
claim 13, wherein the switching table is constituted such that
the encryption communication is switched to the un-encryp-
tion communication in order of predetermined confidenti-
ality from a data type having a low confidentiality to a data
type having a high confidentiality when the count number is
larger than a predetermined threshold.

15. The air conditioning control apparatus according to
claim 10, wherein the processing circuitry is further config-
ured to monitor an amount of processing load placed on the
communicating; and determine, based on the amount of processing load,
whether or not the transmission target data is switched
from the encryption communication to un-encryption
communication.

16. The air conditioning control apparatus according to
claim 15, wherein, when the amount of processing load is
larger than a predetermined threshold, the processing cir-
cuitry is further configured to determine that the transmis-
sion target data is switched from the encryption communi-
cation to the un-encryption communication.

17. The air conditioning control apparatus according to
claim 16, wherein the memory includes a switching table that manages a data type indicating, in
each of a plurality of ranges of the amount of process-
ing load, whether or not the encryption communication
with respect to the transmission target data is switched
to the un-encryption communication, and wherein the processing circuitry is further configured to refer to
the switching table and determine whether or not the transmission target data is switched from the encryption communication to the un-encryption communication.

18. The air conditioning control apparatus according to claim 17, wherein the switching table is constituted such that the encryption communication is switched to the un-encryption communication in order of predetermined confidentiality from a data type having a low confidentiality to a data type having a high confidentiality when the amount of processing load is larger than a predetermined threshold.

19. An air conditioning system comprising:

an air conditioner; and air conditioning control apparatus that monitors the air conditioner, wherein the air conditioner includes:

a first memory; and first processing circuitry coupled to the first memory and configured to:

communicate data to the air conditioning control apparatus, refer to a first table in the first memory that stores whether transmission target data associated with each of data types is an encryption target data or not, determine that the transmission target data is communicated by using encryption communication by the first communicating when the transmission target data is the encryption target data and that the transmission target data is communicated by using un-encryption communication by the first communicating when the transmission target data is not the encryption target data, control the first communicating in order to communicate the transmission target data by using the encryption communication when the transmission target data is communicated by using the encryption communication, and control the first communicating in order to communicate the transmission target data by using the un-encryption communication when the transmission target data is communicated by using the un-encryption communication, the air conditioning control apparatus includes:

a second memory; and second processing circuitry coupled to the second memory and configured to:

communicate data to the air conditioner, refer to a second table in the second memory that stores whether transmission target data associated with each of data types is an encryption target data or not, determine that the transmission target data is communicated by using the encryption communication by the second communicating when the transmission target data is the encryption target data and that the transmission target data is communicated by using un-encryption communication by the second communicating when the transmission target data is not the encryption target data, control the second communicating in order to communicate the transmission target data by using the encryption communication when the transmission target data is communicated by using the encryption communication, and control the second communicating in order to communicate the transmission target data by using the un-encryption communication when the transmission target data is communicated by using the un-encryption communication.

20. The air conditioning system according to claim 19, wherein the first processing circuitry is further configured to monitor a congestion state of data communication performed by the first communicating, and determine, based on a congestion index that indicates the congestion state, whether or not the transmission target data is switched from the encryption communication to un-encryption communication.

21. The air conditioning system according to claim 19, wherein the first processing circuitry is further configured to determine, based on an indoor unit type of each of the air conditioners, whether or not the transmission target data is communicated by using the encryption communication.

22. The air conditioning system according to claim 19, wherein the second processing circuitry is further configured to monitor a count number of the air conditioner, and determine, based on an increase in the count number, whether or not the transmission target data is switched from the encryption communication to un-encryption communication.

23. The air conditioning system according to claim 19, wherein the second processing circuitry is further configured to monitor an amount of processing load placed on the second communicating, and determine, based on the amount of processing load, whether or not the transmission target data is switched from the encryption communication to the un-encryption communication.

\* \* \* \* \*